United States Patent
Eleftheriadis et al.

(10) Patent No.: US 11,451,277 B2
(45) Date of Patent: Sep. 20, 2022

(54) SYSTEMS AND METHODS OF CONTROLLING A COMPONENT OF A NETWORK NODE IN A COMMUNICATION SYSTEM

(71) Applicant: Telefonaktiebolaget LM Ericsson (publ), Stockholm (SE)

(72) Inventors: Lackis Eleftheriadis, Gävle (SE); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/052,761

(22) PCT Filed: May 3, 2018

(86) PCT No.: PCT/EP2018/061285
§ 371 (c)(1),
(2) Date: Nov. 3, 2020

(87) PCT Pub. No.: WO2019/210953
PCT Pub. Date: Nov. 7, 2019

(65) Prior Publication Data
US 2021/0234591 A1    Jul. 29, 2021

(51) Int. Cl.
*H04B 7/06* (2006.01)
*H04W 16/28* (2009.01)
(Continued)

(52) U.S. Cl.
CPC ......... *H04B 7/0617* (2013.01); *H04B 7/0626* (2013.01); *H04B 7/0632* (2013.01);
(Continued)

(58) Field of Classification Search
CPC . H04W 52/0206; H04W 16/28; H04W 52/08; H04W 52/143; H04B 7/0695; H04B 7/0632; H04B 7/0617; H04B 7/0626
(Continued)

(56) References Cited

U.S. PATENT DOCUMENTS 10,700,757 B2 * 6/2020 Singh ................. H04B 7/06
2009/0082034 A1 3/2009 Gray et al.
(Continued)

FOREIGN PATENT DOCUMENTS

WO  2016200302 A1  12/2016
WO  2017184190 A1  10/2017
WO  2018054498 A1  3/2018

OTHER PUBLICATIONS

International Search Report and the Written Opinion of the International Searching Authority, issued in corresponding International Application No. PCT/EP2018/061285, dated Jan. 21, 2019, 27 pages.
(Continued)

*Primary Examiner* — Emmanuel Bayard
(74) *Attorney, Agent, or Firm* — Rothwell, Figg, Ernst & Manbeck, P.C.

(57) ABSTRACT

Systems and methods of controlling a component of a network node in a wireless communication system are presented herein. In one exemplary embodiment, a method by a network node (101, 200, 300, 560, 1400, 1721, 1741) comprises obtaining (401*a*) a current location (140) of a wireless device (119, 510) that is determined from measurements reported by the wireless device of a set of beam reference signals (121-126) transmitted by the network node or measurements performed by the network node of a signal (127) transmitted by the wireless device that is spatially related (129) to the corresponding beam reference signal received by the wireless device. Also, the method includes
(Continued)

controlling (415a) a component (113-115) of the network node that enables or disables a transmission on one or more beams (121-126) of at least one beam reference signal or adjusts a transmission power of a transmission on the one or more beams of at least one beam reference signal or wireless device-specific data signal, based on a set of power trace trajectories (141-144) of the wireless device.

20 Claims, 11 Drawing Sheets

(51) Int. Cl.
    *H04W 52/02*     (2009.01)
    *H04W 52/28*     (2009.01)
    *H04W 64/00*     (2009.01)
    *H04L 5/00*     (2006.01)
    *H04W 24/10*     (2009.01)

(52) U.S. Cl.
    CPC .......... *H04B 7/0695* (2013.01); *H04W 16/28* (2013.01); *H04W 52/0206* (2013.01); *H04W 52/28* (2013.01); *H04W 64/006* (2013.01); *H04L 5/0048* (2013.01); *H04W 24/10* (2013.01)

(58) Field of Classification Search
    USPC .......................................... 375/267, 299, 359
    See application file for complete search history.

(56) References Cited

U.S. PATENT DOCUMENTS

| | | | |
|---|---|---|---|
| 2013/0079962 A1* | 3/2013 | Ishikawa | B60L 15/2045 |
| | | | 701/22 |
| 2016/0088429 A1 | 3/2016 | Gao et al. | |
| 2016/0219569 A1* | 7/2016 | Kuo | H04W 74/0833 |
| 2017/0094531 A1* | 3/2017 | Kakishima | H04L 5/0048 |
| 2017/0223552 A1 | 8/2017 | Roy et al. | |
| 2017/0250746 A1* | 8/2017 | Wang | H04W 36/18 |
| 2017/0374637 A1* | 12/2017 | Akkarakaran | H04W 64/006 |
| 2018/0091249 A1* | 3/2018 | Han | H04L 27/26025 |
| 2019/0253117 A1* | 8/2019 | Raghavan | H04B 7/0632 |

OTHER PUBLICATIONS

Kosmides et al. "On Intelligent Base Station Activation for Next Generation Wireless Networks" Procedia Computer Science 63 (2015), pp. 82-88.

Tee et al. "Artificial Intelligent Power Prediction for Efficient Resource Management of WCDMA Mobile Network" Proceedings of APCC2008, 5 pages.

* cited by examiner

400a

401a — BY A NETWORK NODE, OBTAIN A CURRENT LOCATION OF ONE OR MORE WIRELESS DEVICES THAT IS DETERMINED FROM MEASUREMENTS REPORTED BY EACH WIRELESS DEVICE OF AT LEAST ONE OF A SET OF BEAM REFERENCE SIGNALS TRANSMITTED BY THE NETWORK NODE OR MEASUREMENTS PERFORMED BY THE NETWORK NODE OF A SIGNAL TRANSMITTED BY THE ONE OR MORE WIRELESS DEVICES ON A BEAM THAT IS SPATIALLY RELATED TO A BEAM ASSOCIATED WITH THE CORRESPONDING BEAM REFERENCE SIGNAL RECEIVED BY THAT WIRELESS DEVICE, WITH EACH BEAM REFERENCE SIGNAL BEING TRANSMITTED ON A DIFFERENT BEAM AND IN A DIFFERENT BEAM DIRECTION BY THE NETWORK NODE

403a — OBTAIN CURRENT TRANSMISSION INFORMATION ASSOCIATED WITH A TRANSMISSION BY THE NETWORK NODE TO THAT WIRELESS DEVICE AT THE CURRENT LOCATION OF THAT WIRELESS DEVICE

405a — OBTAIN COLLECTED DATA THAT REPRESENTS TRANSMISSION INFORMATION ASSOCIATED WITH PREVIOUS TRANSMISSIONS BY THE NETWORK NODE TO OTHER WIRELESS DEVICES ALONG PREDICTED ROUTES OF EACH WIRELESS DEVICE

407a — ADAPT, BY A MACHINE LEARNING ALGORITHM, A LINEAR SEPARATION OF THE CURRENT TRANSMISSION INFORMATION FROM THE COLLECTED DATA THAT IS ASSOCIATED WITH THE CURRENT LOCATION OF THAT WIRELESS DEVICE

409a — PROCESS, BY ANOTHER MACHINE LEARNING ARRANGEMENT THAT IS TRAINED WITH THE COLLECTED DATA, THE CURRENT TRANSMISSION INFORMATION TO UPDATE THE COLLECTED DATA

411a — OBTAIN A SET OF PREDICTED ROUTES OF EACH WIRELESS DEVICE BASED ON THE CURRENT LOCATION OF THAT WIRELESS DEVICE

413a — DETERMINE A SET OF POWER TRACE TRAJECTORIES OF EACH WIRELESS DEVICE BASED ON THE COLLECTED DATA AND THE SET OF PROJECTED ROUTES OF THAT WIRELESS DEVICE, WITH EACH POWER TRACE TRAJECTORY REPRESENTING AN ESTIMATED POWER REQUIRED BY THE NETWORK NODE FOR TRANSMISSIONS ON A BEAM TO A WIRELESS DEVICE AT A CERTAIN TIME ALONG PREDICTED ROUTES OF THAT WIRELESS DEVICE STARTING FROM THE CURRENT LOCATION OF THAT WIRELESS DEVICE

415a — CONTROL ONE OR MORE COMPONENTS OF THE NETWORK NODE THAT ENABLES OR DISABLES A TRANSMISSION ON ONE OR MORE BEAMS OF AT LEAST ONE BEAM REFERENCE SIGNAL OR ADJUSTS A TRANSMISSION POWER OF A TRANSMISSION ON THE ONE OR MORE BEAMS OF AT LEAST ONE BEAM REFERENCE SIGNAL OR WIRELESS DEVICE-SPECIFIC DATA SIGNAL, BASED ON THE SET OF POWER TRACE TRAJECTORIES OF EACH WIRELESS DEVICE

FIG. 4A

SYSTEMS AND METHODS OF CONTROLLING A COMPONENT OF A NETWORK NODE IN A COMMUNICATION SYSTEM

CROSS REFERENCE TO RELATED APPLICATION(S)

This application is a 35 U.S.C. § 371 National Phase Entry Application from PCT/EP2018/061285, filed May 3, 2018, designating the United States, the disclosure of which is incorporated herein by reference in its entirety.

TECHNICAL FIELD

The present disclosure generally relates to communication systems, and in particular to controlling a component of a network node in a communication system.

BACKGROUND

The large variety of requirements for the 5$^{th}$ generation wireless system (5G), which is also commonly referred to as Long Term Evolution (LTE) or New Radio (NR), implies that frequency bands at many different carrier frequencies will be needed. For example, low frequency bands will be needed to achieve sufficient coverage and higher frequency bands (e.g., millimeter wavelengths such as that near or above 30 GHz) will be needed to reach the required capacity. At higher frequencies, the propagation properties are more challenging and high-order beamforming at the base station will be required to reach a sufficient link budget.

NR will have a beam centric design, which means that the traditional cell concept is relaxed and user equipment (UEs) will, in many cases, be connected to and perform "handover" between narrow beams instead of cells. Hence, 3$^{rd}$ Generation Partnership Project (3GPP) has agreed to introduce concepts for handling mobility between beams such as within and between transmission/reception points (TRPs). At higher frequencies, where high-gain beamforming will be needed, each beam will only be optimal within a small area and the link budget outside the optimal beam will deteriorate quickly. Hence, frequent and fast beam switching methods are needed to maintain high performance (so called beam management).

For the downlink data channel (e.g., Physical Downlink Shared Channel (PDSCH)), to beam indicator has been introduced in the scheduling downlink control information (DCI) message that informs the UE which beam is used so that the UE may adjust its receive beam accordingly. For the downlink control channel (e.g., Physical Downlink Control Channel (PDCCH)), a beam indicator has been introduced in a separate control message carried by a medium access control (MAC) control element (CE). It is especially important to have this signaling in case of analog receive (RX) beamforming, as the UE needs to know before that data arrives, in which direction to point the RX beam.

To perform measurement of channel quality of a certain beam, a beam reference signal (BRS) is introduced. This may be a channel state information reference signal (CSI-RS), synchronization signal block (SSB) or a synchronization signal/physical broadcast channel (SS/PBCH) block. In NR, up to sixty-four SSBs may be supported, meaning that a gigabit NodeB (gNB) may transmit directed energy in sixty-four different narrow beam directions and when the UE moves around in the cell, it is served by different beams. In a highly loaded cell, many of these sixty-four beams will be used for data traffic transmission in parallel or in a time division multiplexed (TDM) fashion. The beam reference signals are periodic, typically with a twenty millisecond periodicity.

Beamforming implies transmitting the same signal from multiple antenna elements of an antenna array with an amplitude and/or phase shift applied to the signal for each antenna element. These amplitude/phase shifts are commonly denoted as the antenna weights and the collection of the antenna weights for each of the antennas is a precoding vector. Different precoding vectors give rise to beamforming of the transmitted signal and the weights may be controlled so that the signals are coherently combined in a certain angle direction as seen from the antenna array, which is also known as a beam formed in that direction. If the antennas of the array are placed in two dimensions (e.g., on a plane), then the beam may be steered in both azimuth and elevation directions with respect to the plane perpendicular to the antenna array.

Note that even though the term "beam" is used in this disclosure, there are other precoding vectors that provide a transmission that is matched to the channel and which do not provide a beam in a strict sense. For instance, if the channel is known at the TRP, the precoding weight may be controlled so that the signal strength is maximized at the UE, instead of forming a beam to give the maximum array gain in a certain direction. Matched channel precoding is optimal in maximizing the signal power at the receiver, but it requires accurate channel information. However, in line of sight channels, the use of a beam is near optimal.

Measurements for Beam Management

The UE measures the beam reference signals (e.g. up to sixty-four SSB beams) and reports a CSI report having reference signal received power (RSRP) per beam. Typically, the eight strongest measured beams and the associated beam indices are reported. Hence, the network is aware of which eight beams are the strongest for each UE. Each beam reference signal resource is transmitted on a different TRP transmit (TX) beam (e.g., with a different multi-antenna precoding weight to form beams in different directions as referenced from the TRP antenna array). The UE is configured to perform channel quality measurements (e.g., RSRP) using the configured beam reference signal resources corresponding to the different TRP TX beams and it may be further configured to report back these measurements to the network. In this way, it is possible, by using the measurement report(s), for the network to find a preferred TRP TX beam(s) for a given UE.

The beam reference signal transmission may be either aperiodic (e.g., event triggered) or transmitted in a semi-persistent/periodic manner. For transmissions of the beam reference signal in a semi-persistent/periodic manner, the measurement reports may be configured in a semi-persistent/periodic manner. The SSB may only be periodic, while the beamformed CSI-RS may be aperiodic or semi-persistently transmitted.

If analog beamforming is used at gNB or UE, then the gNB may only transmit one beam (e.g., one beam reference signal) at a time (per orthogonal frequency division multiplexed (OFDM) symbol). In SSB-based beam transmission, the same beam is used for a group of four adjacent OFDM symbols since the SSB occupies four adjacent OFDM symbols. After one SSB has been transmitted, the next SSB of four OFDM symbols may be transmitted in another beam direction. In case sixty-four beams are used with the periodic SSB, then after sixty-four different beams have been transmitted after twenty milliseconds (20 msec.), the first beam is transmitted again and the procedure repeats.

Power Management in Base Stations

A physical resource block (PRB) is the lowest available power information content inside a subframe that has power information in the time-frequency grid(s) matrix and that enables the possibility to calculate and summarize the power consumption, from beam(s) and antenna ports, to enable control of the internal radio parts (e.g., segmented direct current (DC)/DC converters, system power supply unit (PSU)). Based on the summarized information from subframe or slot information, the control of the segmented DC/DC convertor(s) or the system PSU such as an alternating current (AC)-to-DC rectifier inside the base station may be enabled. The subframe or slot information formation is available one transmission time interval (TTI) in advance, and may be used to set the preconditions and control functionality for the segmented DC/DC convertors and the system PSU, to save power in conjunction with the beamforming.

In the near future, the telecom data traffic will dramatically increase. More base stations with 5G radio functionality will be deployed. The 5G base station nodes (e.g., eNB, gNB) with beamforming needs to be installed to manage the increased data traffic with improved quality of service (QoS) towards the mobile device (UE) or other Internet of things (IoT) device. The new 5G base station as well as an upgraded $4^{th}$ generation wireless system (4G) base station having beamforming with a large number of antenna elements and power amplifiers will have increased power consumption and power demand. Therefore, new power savings features are desired to reduce the total power consumption of an upgraded 4G or 5G base station and to improve overall network energy performance.

Moreover, if a large number of SSB beams (e.g., sixty-four SSB beams) are transmitted during low traffic load situations, many of these SSB beams may not be used. Hence, continually or periodically transmitting energy on these beams may result in wasted power consumption by the 4G/5G base station. On the other hand, disabling the transmission of certain beam reference signals on an associated beam may make it difficult for a UE to discover that beam.

Accordingly, there is a need for improved techniques for reducing energy consumption of a base station utilizing beamforming. Further, there is a need for improved techniques for efficiently disabling beams without impacting a UEs mobility and network performance. In addition, other desirable features and characteristics of the present disclosure will become apparent from the subsequent detailed description and embodiments, taken in conjunction with the accompanying figures and the foregoing technical field and background.

The background section of this disclosure is provided to place embodiments of the present disclosure in technological and operational context, to assist those of skill in the art in understanding their scope and utility. Unless explicitly identified as such, no statement herein is admitted to be prior art merely by its inclusion in the background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Systems and methods of controlling a component of a network node in a communication system are presented herein. According to one aspect, a method by a network node in a communications system comprises obtaining a current location of one or more wireless devices that is determined from measurements reported by each wireless device of at least one of a set of beam reference signals transmitted by the network node or measurements performed by the network node of a signal transmitted by the one or more wireless devices on a beam that is spatially related to a beam associated with the corresponding beam reference signal received by that wireless device. Each beam reference signal is transmitted on a different beam and in a different beam direction by the network node. Also, the method includes controlling one or more components of the network node that enables or disables a transmission on one or more beams of at least one beam reference signal or adjusts a transmission power of a transmission on the one or more beams of at least one beam reference signal or wireless device-specific data signal, based on a set of power trace trajectories of each wireless device. In addition, each power trace trajectory represents an estimated power required by the network node for transmissions on a beam of a beam reference signal or a wireless device-specific data signal to a corresponding wireless device or to a wireless device having a same classification as the corresponding wireless device, at a certain time along predicted routes of that wireless device starting from the current location of that wireless device.

According to another aspect, the method includes obtaining collected data that represents a transmission information associated with previous transmissions on the one or more beams of a beam reference signal or a wireless device-specific data signal by the network node to other wireless devices along the predicted routes of each wireless device. Further, the method includes determining the set of power trace trajectories of each wireless device based on the collected data and the set of projected routes of that wireless device.

According to another aspect, the step of obtaining the collected data includes obtaining current transmission information associated with a transmission, by the network node on a beam that corresponds to the current location of that wireless device, of a beam reference signal or a wireless device-specific data signal. Also, this step of obtaining includes processing, by a first machine learning arrangement that is trained with the collected data so that the set of power trace trajectories of each wireless device are predicted, the current transmission information to update the collected data.

According to another aspect, the step of obtaining the current transmission information includes receiving, from another network node associated with that wireless device, the current transmission information.

According to another aspect, the step of obtaining the collected data includes adapting, by a second machine learning algorithm, a linear separation of the current transmission information from the collected data that is associated with the current location of that wireless device.

According to another aspect, the current transmission information includes:
 a power usage of the network node for transmissions on the one or more beams of a beam reference signal or a wireless device-specific data signal to that wireless device at the current location or along the predicted routes of that wireless device;
a resource allocation of the network node for transmissions on the one or more beams of a beam reference signal or a wireless device-specific data signal to that wireless device at the current location or along the predicted routes of that wireless device;
a classification of that wireless device at the current location or along the predicted routes of that wireless device, wherein each classification is associated with a different transmit or receive data rate; or
a type of beam transmitted between the network node and that wireless device at the current location or along the predicted routes of that wireless device.

According to another aspect, the method includes obtaining the predicted routes of each wireless device based on the current location of that wireless device.

According to another aspect, the step of obtaining the predicted routes includes receiving, from another network node, the predicted routes of at least one of the one or more wireless devices.

According to another aspect, the step of obtaining the predicted routes includes determining the predicted routes of at least one of the one or more wireless devices based on the current location of that wireless device.

According to another aspect, the step of controlling the one or more components includes selectively controlling two or more components of the network node based on the set of power trace trajectories of each wireless device.

According to another aspect, the step of selectively controlling the two or more components includes controlling a first component of a radio unit of the network node to disable a transmission of at least one beam reference signal or wireless device-specific data signal by a beamforming antenna element prior to controlling a third component to disable power to the radio unit.

According to another aspect, the one or more components of the network node include:
a first component of a radio unit of the network node that is operable to enable or disable a transmission of at least one beam reference signal or wireless device-specific data signal by a beamforming antenna element;
a second component of the radio unit that is operable to adjust a transmission power of a transmission of at least one beam reference signal or wireless device-specific data signal; or
a third component that is operable to enable or disable power to the radio unit.

According to another aspect, the step of controlling the one or more components includes controlling the one or more components to enable or disable the transmission of the at least one beam reference signal responsive to determining that the at least one beam reference signal is directed towards or away from the predicted routes of the one or more wireless devices.

According to another aspect, the predicted routes represent at least one of a minimum route, a maximum route, and a route between the minimum and maximum routes for that wireless device.

According to another aspect, the step of controlling the one or more components is also based on a classification of each wireless device.

According to another aspect, each classification is associated with a different transmit or receive data transfer rate.

According to another aspect, the step of controlling the one or more components is so that the network node consumes less power than that required to always transmit the set of beam reference signals by the network node at a non-adjusted transmission power.

According to another aspect, each wireless device is associated with the network node or another network node that is communicatively coupled to the network node.

According to another aspect, the method includes sending, by the network node, to a second network node that is associated with at least one of the one or more wireless devices, an indication that the second network node is to control one or more components of the second network node based on a set of power trace trajectories of that wireless device.

According to another aspect, the method includes sending, by the network node, to a second network node that is associated with at least one of the one or more wireless devices, current transmission information associated with a transmission by the network node on the one or more beams to that wireless device at the current location of that wireless device.

According to another aspect, the step of sending the current transmission information is responsive to determining that that wireless device is in a region that represents an intersection between a cell of the network node and a cell of the second network node.

According to another aspect, the method includes receiving, by the network node, from a second network node that is associated with at least one of the one or more wireless devices, an indication that the network node is to control one or more components of the network node based on the set of power trace trajectories of that wireless device.

According to another aspect, each power trace trajectory includes one or more of the following:
a power usage of the network node for transmissions on the one or more beams of a beam reference signal or a wireless device-specific data signal to a wireless device at a certain location or along a certain route of that wireless device;
a resource allocation of the network node for transmissions on the one or more beams of a beam reference signal or a wireless device-specific data signal to a wireless device at the certain location or along the certain route of that wireless device;
a classification of a wireless device at the certain location or along the certain route of that wireless device, wherein each classification is associated with a different transmit or receive data rate; or
a type of beam transmitted between the network node and a wireless device at the certain location or along the certain route of that wireless device.

According to another aspect, each power trace trajectory includes information that represents amplitude and phase shifts associated with one or more antennas.

According to one aspect, a network node in a communications system is configured to obtain a current location of one or more wireless devices that is determined from measurements reported by each wireless device of at least one of a set of beam reference signals transmitted by the network node or measurements performed by the network node of a signal transmitted by the one or more wireless devices on a beam that is spatially related to a beam associated with the corresponding beam reference signal received by that wireless device. Each beam reference signal is transmitted on a different beam and in a different beam direction by the network node. Further, the network node is configured to control one or more components of the network node that enables or disables a transmission on one or more beams of at least one beam reference signal or adjusts a transmission power of a transmission on the one or more beams of at least one beam reference signal or wireless device-specific data signal, based on a set of power trace trajectories of each wireless device. Also, each power trace trajectory represents an estimated power required by the network node for transmissions on a beam of a beam reference signal or a wireless device-specific data signal to a corresponding wireless device or to a wireless device having a same classification as the corresponding wireless device, at a certain time along predicted routes of that wireless device starting from the current location of that wireless device.

According to one aspect, a network node in a communication system comprises a location obtaining unit for obtaining a current location of one or more wireless devices that is determined from measurements reported by each wireless device of at least one of a set of beam reference signals transmitted by the network node or measurements performed by the network node of a signal transmitted by the one or more wireless devices on a beam that is spatially related to a beam associated with the corresponding beam reference signal received by that wireless device. Each beam reference signal is transmitted on a different beam and in a different beam direction by the network node. The network node also comprises a controlling unit for controlling one or more components of the network node that enables or disables a transmission on one or more beams of at least one beam reference signal or adjusts a transmission power of a transmission on the one or more beams of at least one beam reference signal or wireless device-specific data signal, based on a set of power trace trajectories of each wireless device. In addition, each power trace trajectory represents an estimated power required by the network node for transmissions on a beam of a beam reference signal or a wireless device-specific data signal to a corresponding wireless device or to a wireless device having a same classification as the corresponding wireless device, at a certain time along predicted routes of that wireless device starting from the current location of that wireless device.

According to one aspect, a computer program comprises instructions which, when executed on at least one processor of a network node in a communication system, cause the at least one processor to carry out any of the methods described herein. Further, a carrier may contain the computer program, with the carrier being one of an electronic signal, optical signal, radio signal, or computer readable storage medium.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 4A-C illustrate embodiments of a method performed by a network node of controlling a component of the network node in a communication system in accordance with various aspects as described herein.

DETAILED DESCRIPTION

Figure 1:
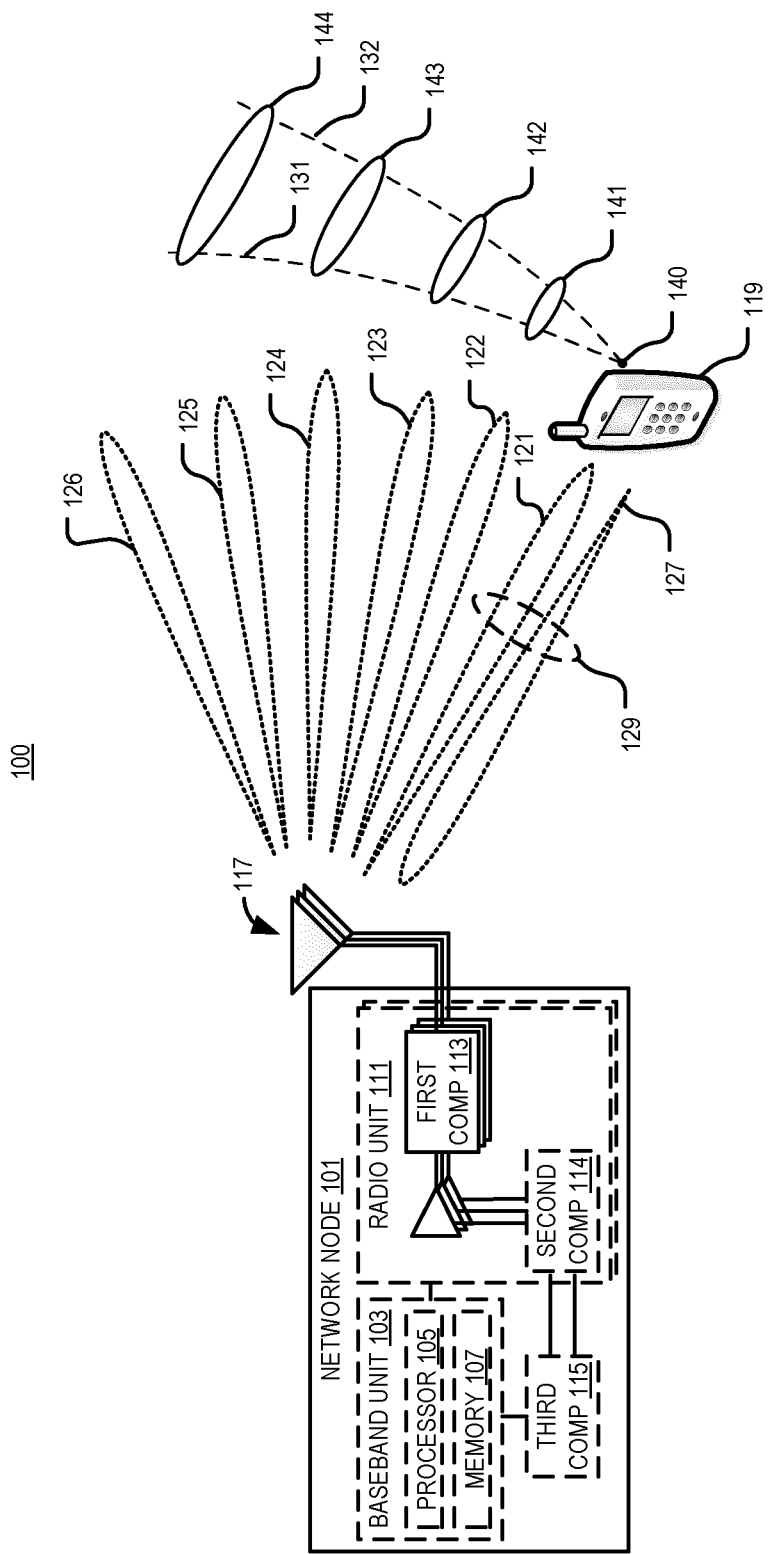
FIG. 1 illustrates one embodiment of a system of controlling a component of a network node in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

This disclosure describes, among other things, various techniques to reduce network energy usage and to enable power savings by a network node (e.g., base station, Evolved NodeB (eNB), gNB), which may include a cluster of network nodes (e.g., neighboring network nodes), that use beamforming and wireless device (e.g., UE) propagation that enables mapping power usage by the network node for various locations and routes of wireless devices associated with that network node. These techniques include, individually or in combination, determining a location of a wireless device served by a network node using beam information, disabling beams such as those associated with beam reference signals, reducing beam power in beams where there are no wireless devices served, which may include disabling associated hardware components in the network node (e.g., segmented DC/DC converter, an AC/DC rectifier, system PSU). Further, these techniques include applying tracing algorithms to predict wireless device movements around the network node so as to control enabling/disabling beams based on when the wireless devices require use of each beam.

Furthermore, the location of a wireless device at a given point in time may be estimated based on the preferred beam usage (e.g., obtained angle domain) obtained from wireless device measurements of beam reference signals and associated CSI reports transmitted by the wireless device to the network. Further, the location of a wireless device may be estimated based on measurements performed by a network node of uplink transmissions by the wireless device of reference signals (e.g., SRS) that have channel reciprocity with downlink transmission by the network node. Also, the location of a wireless device may be traced using routing based on a machine learning arrangement such as that shown in FIG. 9. A machine learning arrangement may also be used to predict future power usage of a network node or a cluster of neighboring network nodes (e.g., base station and neighboring base station(s) in a radio access network (RAN)). A machine learning arrangement may also predict when beams are to be transmitted in a network so that beam reference signals are transmitted in "soon to be active" beams or may predict the transmission power required for transmissions. This avoids transmitting beam reference signals in all beams all of the time, which reduces overall energy/power consumption by a network node or a cluster of neighboring network nodes.

Moreover, power trace information may be shared between neighboring network nodes or with the core network to enable power savings towards neighboring nodes. This shared information may include: power usage (e.g., subframe or slot information such as that represented by a PRB time-frequency grid), beam type (e.g., narrow beam, wide beam, or the like), beam use over time for each UE classification, network node component use (e.g., segmented DC/DC converter(s) use, AC/DC rectifier use, PSU use, or the like), amplitude/phase shift information (e.g., antenna weights), a collection of antenna weights for each antenna of a network node (which may be represented by a precoding vector), or the like. Further, a network node may share this information with or between neighboring network nodes, the RAN, or the core network.

Advantages of the techniques described herein include controlling, for instance, components (e.g., segmented DC/DC converter(s) in the radio unit, AC/DC rectifier(s), system PSU, or the like) of a network node based on predicting the power/energy usage of the network node so that the network node saves energy. These components may include a component that enables or disables a transmission of at least one beam reference signal or adjusts a transmission power of a transmission of at least one beam reference signal or wireless device-specific data signal. The power/energy usage of the network node may be predicted by tracking a wireless device such as via a machine learning arrangement that determines a beamforming configuration based on a current location of a wireless device and the power required by the network node for a transmission to that current location. Another advantage includes determining a power trace map for wireless devices based on beamforming that enables faster control (e.g., milliseconds, microseconds, or the like) of components of the network node, resulting in further energy savings for the network node. In another advantage, by knowing the power trace map of the wireless devices in advance and sending associated information to neighboring network nodes such as in a cluster of neighboring network nodes, components of each network node may be activated/deactivated, resulting in further energy savings for the cluster.

For example, FIG. 1 illustrates one embodiment of a system 100 of controlling a component 113-115 of a network node 101 in accordance with various aspects as described herein. In FIG. 1, the system 100 includes a network node 101 (e.g., base station, eNB, gNB) and a wireless device 119 (e.g., UE). The network node 101 transmits each beam reference signal on a different beam 121-126 and in a different beam direction. As shown, the network node 101 transmits the beam 121 in a certain beam direction that corresponds to a current location 140 of the wireless device 119. A beam represents radiation that is transmitted or received in a certain direction by an antenna such as a directional antenna or an antenna array. Beamforming (e.g., precoding) or spatial filtering is a signal processing technique used with antenna arrays for directional transmission or reception of a signal. To change the directionality of the antenna array when transmitting or receiving, a beamformer or spatial filter controls the phase and relative amplitude of the signal transmitted or received at each antenna element of the antenna array, in order to create a pattern of constructive and destructive interference. The network node 101 may obtain the current location 140 of the wireless device 119 based on measurements reported by the wireless device 119 of the beam reference signal transmitted on beam 121 by the network node 101. Further, the network node 101 may obtain the current location 140 based on measurements performed by the network node 101 of a signal transmitted by the wireless device 119 on a beam 127 that is spatially related 129 to the beam 121 received by the wireless device 119.

In FIG. 1, the network node 101 may obtain current transmission information associated with a transmission, by the network node 101, to the wireless device 119, on the beam 121 of a beam reference signal or a wireless device-specific data signal at the current location 140. The current transmission information may include a power usage of the network node 101 for transmissions on the beam 121 of a beam reference signal or a wireless device-specific data signal to the wireless device 119 at the current location 140 or on one or more beams 121-126 along one or more predicted routes 131-132 starting from the current location 140, a resource allocation (e.g., such as that represented by a PRB time-frequency grid) of the network node 101 for transmissions on the beam 121 to the wireless device 119 at the current location 140 or transmissions on one or more beams 121-126 along the one or more predicted routes 131-132, a classification of the wireless device 119 at the current location 140 or along the one or more predicted routes 131-132, a type of beam transmitted between the network node 101 and the wireless device 119 at the current location 140 or along the one or more predicted routes 131-132, or the like. In one example, the network node 101 may receive, from another network node or core network node, the current transmission information. In another example, the network node 101 may determine the current transmission information from one or more measurements reported by the wireless device 119 of a beam reference signal or wireless device-specific data signal transmitted on a beam 121-126 by the network node 101. In yet another example, the network node 101 may perform one or more measurements of a signal transmitted by the wireless device 119 on a beam that is spatially related to a beam 121-126 associated with a corresponding beam reference signal or wireless device-specific data signal transmitted by the network node 101. All or a portion of the current transmission information may be stored in a memory associated with the network node 101. In NR, there may be many beams, in many layers, that are collected and analyzed. For each layer, PRBs in a subframe or slot are analyzed to obtain their respective power values. Further, these power values for each PRB in the subframe or slot may be available one transmission time interval (TTI) in advance. In one definition, a TTI refers to a duration of a transmission on a radio link.

In this embodiment, the network node 101 may obtain collected data that represents a plurality of transmission information associated with previous transmissions by the network node 101 to other wireless devices along predicted routes of each wireless device. In one example, the network node 101 may receive, from another network node or core network node, all or a portion of the collected data. In another example, the network node 101 may obtain all or a portion of the collected data from its memory. The predicted routes may also represent routes that are based on a power classification (e.g., different maximum transmit power) of the UE. Further, the network node 101 may adapt, by a machine learning arrangement, a linear separation of the current transmission information from the collected data that is associated with the current location 140 of the wireless device 119. To avoid misleading data based on different routes of wireless devices from a certain location, this machine learning arrangement may extract the minimum, average (or mean), and maximum power consumption. In addition, the network node 101 may process, by another machine learning arrangement that is trained with the collected data, the current transmission information to update the collected data. Based on the updated collected data from this other machine learning arrangement, the network node 101 predicts future power trace trajectories for the wireless device 119, with each power trace trajectory representing an estimated power required by the network node 101 for transmissions on a beam of a beam reference signal, a wireless device-specific data signal, or the like to the wireless device 119 at a certain time along its one or more predicted routes 131-132. A set of power trace trajectories of a wireless device represents estimated power required by the network node 101 for transmissions, on one or more beams that correspond to one or more predicted routes 131-132 of the wireless device 119, of beam reference signals, wireless device-specific data signals, or the like. A power trace trajectory map represents sets of power trace trajectories for different wireless devices.

In FIG. 1, the network node 101 may obtain predicted routes 131-132 of the wireless device 119 based on its current location 140. The predicted routes 131-132 may include at least one of an expected route, a minimum predicted route, a maximum predicted route, and a predicted route that is between the minimum and maximum predicted routes such as an average predicted route, a mean predicted route, or the like. The predicted routes 131-132 may be determined based on past measurements reported by other wireless devices of a beam reference signal transmitted on a beam 121-126 by the network node 101 or past measurements performed by the network node of a signal transmitted by other wireless devices on a beam that is spatially related to a beam 121-126 associated with the corresponding beam reference signal received by that wireless device. A skilled artisan will readily recognize various techniques for predicting one or more routes of a wireless device from a current location of that wireless device based on this measurement information. In one example, route prediction may be based on a hidden Markov model. In another example, route prediction may use a machine learning arrangement or artificial intelligence arrangement.

Furthermore, the network node 101 may also determine a set of power trace trajectories 141-144 of the wireless device 119 based on the collected data and the set of projected routes 131-132. Each power trace trajectory 141-144 represents estimated power required by the network node 101 for transmissions to the wireless device 119 at a certain time along the predicted routes 131-132 of the wireless device 119 starting from its current location 140. Further, different classifications of wireless devices (e.g., UE classification) require different power usage by the network node 101. In one example, a wireless device classification is based on different transmit or receive data rates (e.g., data rates associated with transmission/reception of a text message, voice call, streaming music, streaming video, or the like). In addition, the network node 101 controls one or more components 113-115 of the network node 101 that enables or disables a transmission of at least one beam reference signal on a corresponding beam 121-126 or adjusts a transmission power of a transmission of at least one beam reference signal or wireless device-specific data signal on a corresponding beam 121-126, based on the set of power trace trajectories 141-144 of the wireless device 119.

In FIG. 1, the network node 101 may be configured to include a baseband unit 103, one or more radio units 111, and an array of antennas 117 that are operable to perform transmit and/or receive beamforming. The baseband unit 103 may be configured to include a processor 105 operatively coupled to a memory 107. The processor may be operatively coupled to any of the other components of the network node 101. Each radio unit 111 may include one or more components associated with transmission/reception of signals via the antenna array 117. Each radio unit 111 may include one or more first components 113 with each being operable to enable or disable a transmission on a beam 121-126 via the antenna array 117. For example, each first component 113 includes one or more switch circuits for enabling or disabling a transmission to a corresponding beamforming antenna element of the antenna array 117. Further, each radio unit 111 may include a second component 114 that is operable to adjust a transmission power of a transmission on a beam 121-126 via the antenna array 117. For example, the second component 114 includes one or more controllable segmented DC-to-DC converters. The network node 101 may also include a third component 115 that is operable to enable or disable power to each radio unit 111. For example, the third component 115 includes a controllable PSU. In another example, the third component 115 includes one or more controllable AC/DC rectifiers.

In the current embodiment, the network node 101 may selectively control the first, second, and/or third components 113-115 based on the set of power trace trajectories 141-144 of the wireless device 119. In one example, the network node 101 disables the second component 114 of the radio unit 111 responsive to determining that all of the first components 113 associated with that second component 114 are disabled. In another example, the network node 101 controls the third component 115 to disable power delivered to the radio unit 111 responsive to determining that all of the first and second components 114 of that radio unit 111 are disabled. In yet another example, one of a plurality of beams that are associated with one of a plurality of segmented DC/DC converters is disabled (e.g., in NR, 1 of 5 selected beams are disabled). Further, once all of the plurality of beams associated with the converter are disabled, then the converter is disabled. Also, once all converters associated with a system PSU are disabled, then the PSU is disabled. Accordingly, the network node 101 saves energy by predicting the future power use of the network node 101 in serving the wireless device 119, based on machine learning to allow for the use of one of the plurality of beams for the wireless device 119 at any given time.

Additionally or alternatively, the network node 101 may be configured to support a wireless communication system (e.g., NR, LTE, Long Term Evolution New Radio (LTE-NR), Universal Mobile Telecommunications System (UMTS), Global System for Mobile communications (GSM), or the like). Further, the network node 101 may be a base station (e.g., eNB), an access point, a wireless router, or the like. The network node 101 may serve wireless devices such as wireless device 119. The wireless device 119 may be configured to support a wireless communication system (e.g., NR, LTE, LTE-NR, UMTS, GSM, or the like). The wireless device 119 may be a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like.

Figure 2:
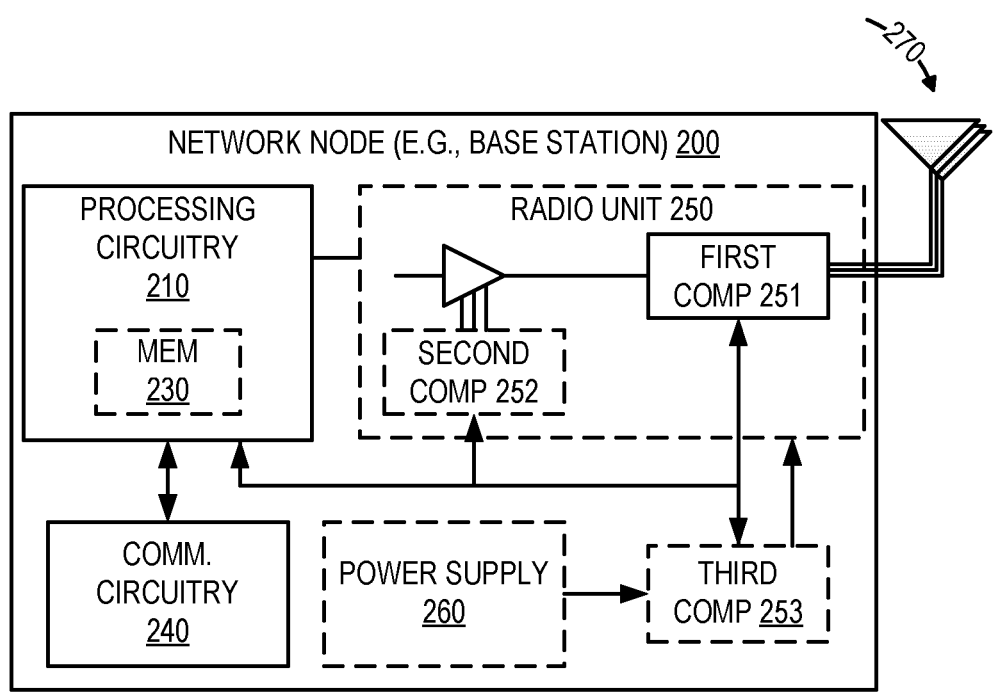
FIG. 2 illustrates one embodiment of a network node in accordance with various aspects as described herein.

FIG. 2 illustrates one embodiment of a network node 200 in accordance with various aspects as described herein. As shown, the network node 200 includes processing circuitry 210 and communication circuitry 240. The communication circuitry 240 is configured to transmit and/or receive information to and/or from one or more other network nodes (e.g., via any communication technology). The processing circuitry 210 is configured to perform processing described above, such as by executing instructions stored in memory 230. The processing circuitry 210 in this regard may implement certain functional means, units, or modules. The network node 200 may also include a radio unit 250 and a power supply 260. The radio unit 250 may be configured to transmit and/or receive information to and/or from one or more wireless devices (e.g., via any communication technology). The radio unit may include one or more component circuitry 251-252. The first component circuitry 251 may be configured to enable or disable a transmission on a beam via an antenna array 270. The second component circuitry 252 may be configured to adjust a transmission power of a transmission on a beam via the antenna array 270. In one example, the second component circuitry 252 includes one or more segmented DC/DC converters that provides DC power to a corresponding power amplifier that is associated with a transmission on a beam via the antenna array 270. The network node 200 may also include third component circuitry 253 that is configured to enable or disable power delivered by a power supply 260 to the radio unit 250 or to one or more components of the radio unit 250 such as the first and second component circuits 251-252.

Figure 3:
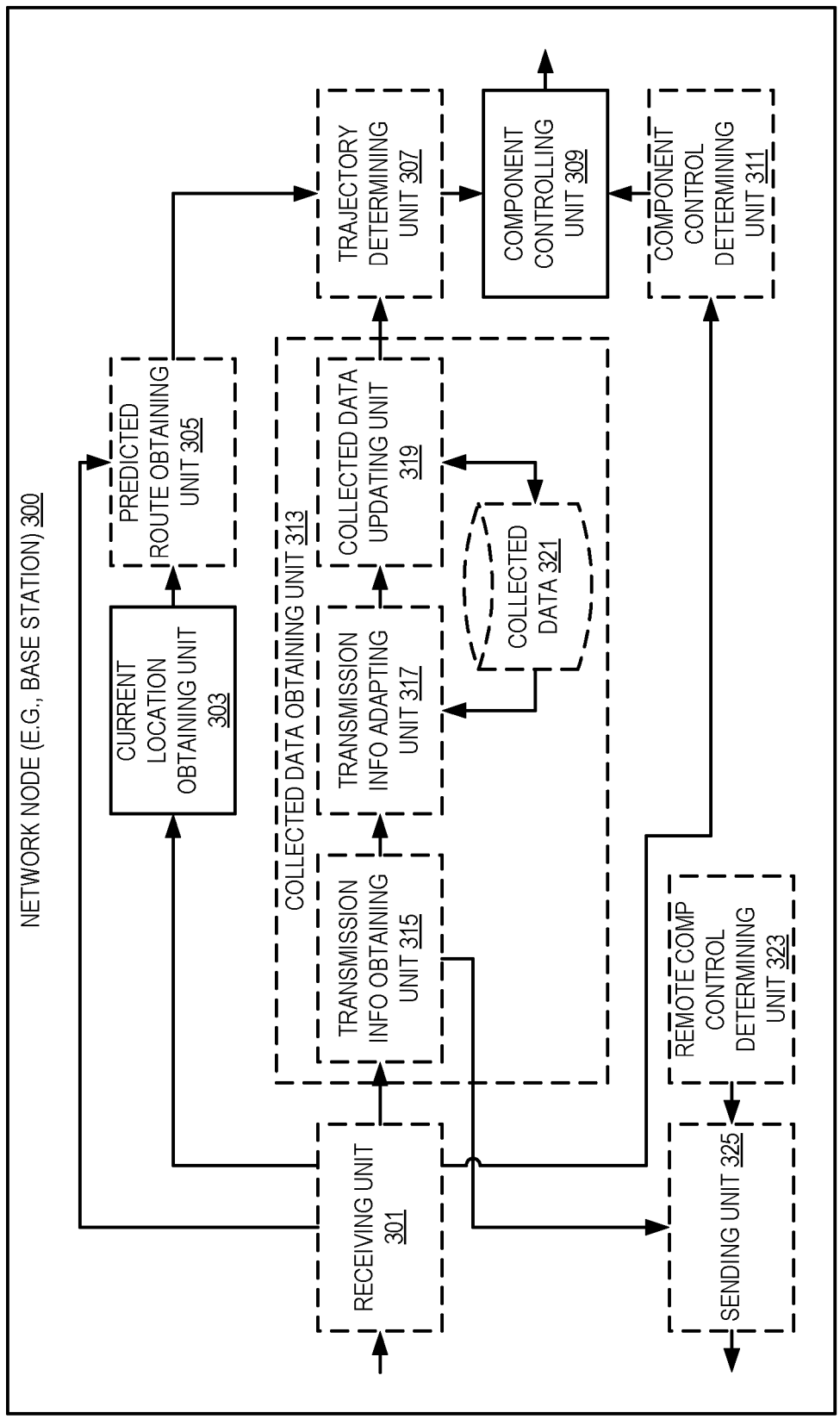
FIG. 3 illustrates another embodiment of a network node in accordance with various aspects as described herein.

FIG. 3 illustrates another embodiment of a network node 300 in accordance with various aspects as described herein. As shown, the network node 300 implements various functional means, units, or modules (e.g., via the processing circuitry 210 in FIG. 2, via software code), or circuits. In one embodiment, these functional means, units, modules, or circuits (e.g., for implementing the method(s) herein) may include for instance: a current location obtaining unit 303 for obtaining a current location of one or more wireless devices that is determined from measurements reported by each wireless device of at least one of a set of beam reference signals transmitted by the network node or measurements performed by the network node of a signal transmitted by the one or more wireless devices on a beam that is spatially related to a beam associated with the corresponding beam reference signal received by that wireless device; and a component controlling unit 309 for controlling one or more components of the network node that enables or disables a transmission of at least one beam reference signal or adjusts a transmission power of a transmission of at least one beam reference signal or wireless device-specific data signal, based on the set of power trace trajectories of each wireless device.

In another embodiment, these functional means, units, modules, or circuits may include for instance: a collected data obtaining unit 313 for obtaining collected data 321 that represents network node transmission information associated with previous transmissions by the network node to other wireless devices along routes of each wireless device.

In another embodiment, the collected data obtaining unit 313 may include a transmission information obtaining unit 315 for obtaining current network node transmission information associated with a transmission by the network node to that wireless device at the current location of that wireless device; a transmission information adapting unit 317 for adapting, by a machine learning algorithm, a linear separation of the current network node transmission information and the collected data 321 that is associated with the current location of that wireless device; and a collected data updating unit 319 for processing, by another machine learning arrangement that is trained with the collected data 321, the current network node information to update the collected data 321.

In another embodiment, these functional means, units, modules, or circuits may include for instance: a predicted route obtaining unit 305 for obtaining predicted routes of each wireless device based on a current location of that wireless device.

In another embodiment, these functional means, units, modules, or circuits may include for instance: a power trace trajectory determining unit 307 for determining a set of power trace trajectories of each wireless device based on the collected data 321 and a set of projected routes of that wireless device.

In another embodiment, these functional means, units, modules, or circuits may include for instance: a component control determining unit 311 for determining a set of power trace trajectories of each wireless device based on the collected data 321 and a set of projected routes of that wireless device.

In another embodiment, these functional means, units, modules, or circuits may include for instance: a remote component control determining unit 323 for determining whether a second network node that is associated with the same wireless device as the network node 300 is to control one or more components of the second network node based on a set of power trace trajectories of the wireless device; and a sending unit 325 for sending, to the second network node, information such as a current location of the wireless device, a predicted route of the wireless device from its current location, transmission information associated with a transmission by the network node 300 to the wireless device at its current location, an indication that the second network node is to control its components based on a set of power trace trajectories of the wireless device such as a power usage (e.g., subframe or slot information), a type of beam used (e.g., power, beam time used dedicated to the classification, segmented DC/DC converter used or/not, system PSU activation or not, or the like). Furthermore, information that may be shared between nodes includes amplitude/phase shifts (e.g., antenna weights) or a collection of antenna weights for each of the antennas, which may be in the form of a precoding vector.

In another embodiment, these functional means, units, modules, or circuits may include for instance: a receiving unit 301 for receiving, from a second network node, information such as a current location of a wireless device, a predicted route of the wireless device from its current location, transmission information associated with a transmission by the second network node to the wireless device at its current location, an indication that the network node 300 is to control its components based on a set of power trace trajectories of the wireless device.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4B:
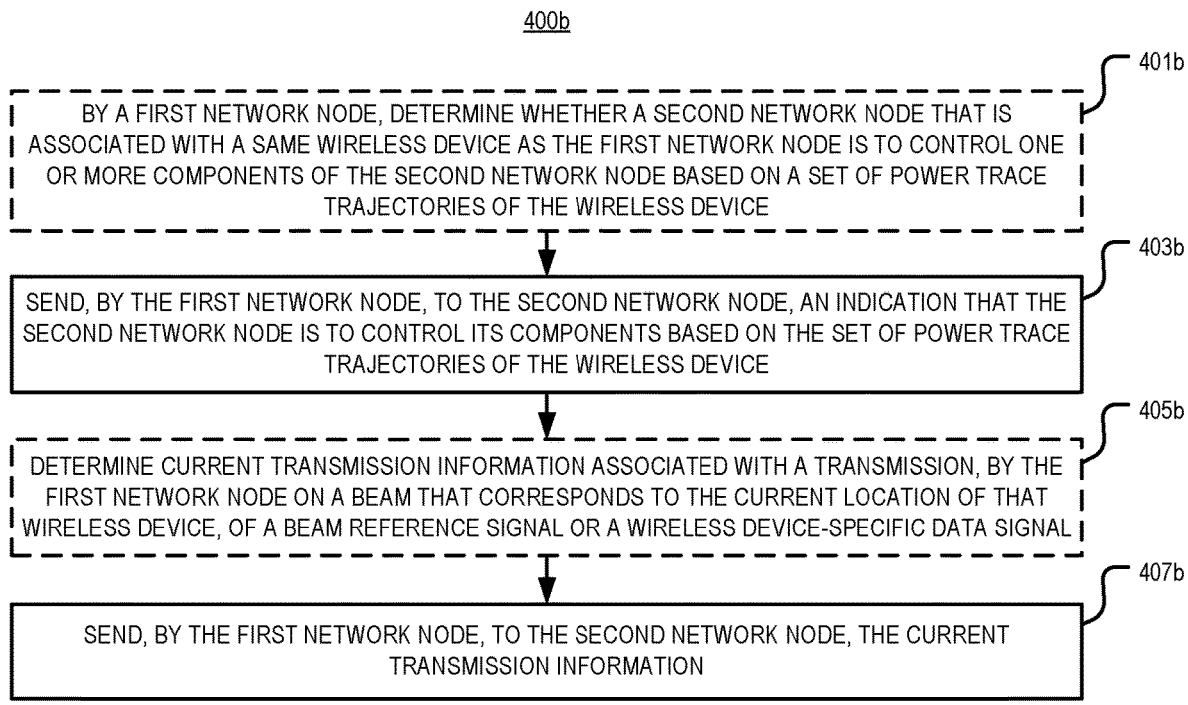
Figure 4C:
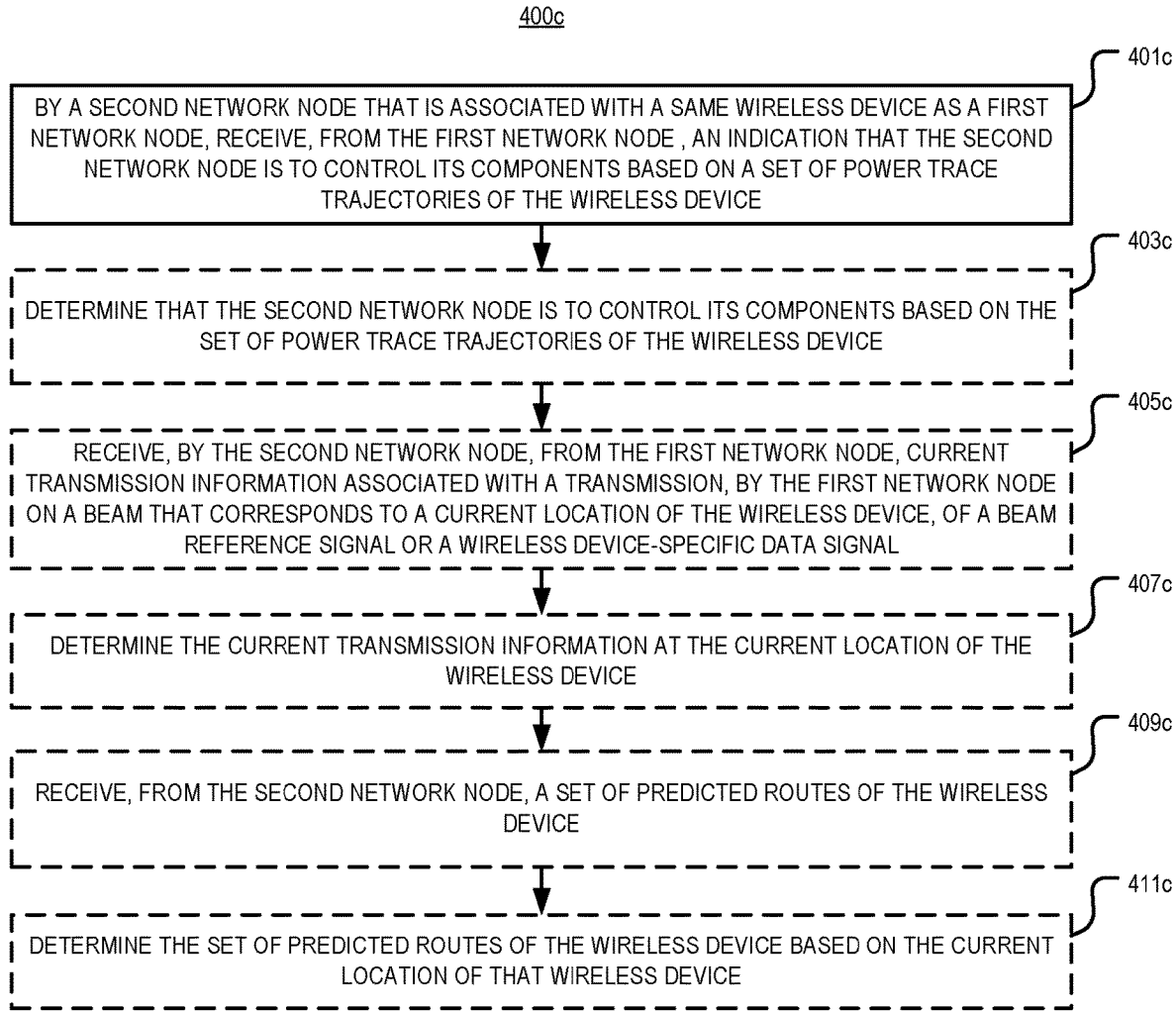

FIGS. 4A-C illustrate embodiments of a method 400a performed by a network node of controlling a component of the network node in a communication system in accordance with various aspects as described herein. In FIG. 4A, the method 400a may start, for instance, at block 401a, where it includes obtaining a current location of one or more wireless devices that is determined from measurements reported by each wireless device of at least one of a set of beam reference signals transmitted by the network node or measurements performed by the network node of a signal transmitted by the one or more wireless devices on a beam that is spatially related to a beam associated with the corresponding beam reference signal received by that wireless device. Further, each beam reference signal is transmitted on a different beam and in a different beam direction by the network node. At block 403a, the method 400a includes obtaining current transmission information associated with a transmission by the network node to that wireless device at the current location of that wireless device. At block 405a, the method 400a may include obtaining collected data that represents transmission information associated with previous transmissions by the network node to other wireless devices along routes of each wireless device.

Furthermore, the method 400a may include adapting, by a second machine learning algorithm, a linear separation of the current transmission information from the collected data that is associated with the current location of that wireless device, as referenced by block 407a. At block 409a, the method 400a may include processing, by a first machine learning arrangement that is trained with the collected data, the current network node information to update the collected data. At block 411a, the method 400a may include obtaining the predicted routes of each wireless device based on the current location of that wireless device. Also, the method 400a may include determining the set of power trace trajectories of each wireless device based on the collected data and the set of projected routes of that wireless device, with each power trace trajectory representing estimated power required by the network node for transmissions on a beam to a wireless device at a certain time along predicted routes of that wireless device starting from the current location of that wireless device, as referenced by block 413a. Finally, the method 400a includes controlling one or more components of the network node that enables or disables a transmission on one or more beams of at least one beam reference signal or adjusts a transmission power of a transmission of at least one beam reference signal or wireless device-specific data signal, based on the set of power trace trajectories of each wireless device, as referenced by block 415a.

In FIG. 4B, the method 400b may start, for instance, at block 401b, where it includes determining, by a first network node, whether a second network node that is associated with a same wireless device or a same classification of that wireless device as the first network node is to control one or more components of the second network node based on a set of power trace trajectories of the wireless device. Further, the method 400b includes sending, by the first network node, to the second network node, an indication that the second network node is to control its components based on the set of power trace trajectories of the wireless device, as referenced by block 403b. At block 405b, the method 400b may include determining current transmission information associated with a transmission, by the first network node on a beam that corresponds to a current location of that wireless device, of a beam reference signal or a wireless device-specific data signal. Also, the method 400b includes sending, by the first network node, to the second network node, the current transmission information, as referenced by block 407b.

In FIG. 4C, the method 400c may start, for instance, at block 401c, where it includes receiving, by a second network node that is associated with a same wireless device as a first network node, from the first network node, an indication that the second network node is to control its components based on a set of power trace trajectories of the wireless device or its classification. Further, the method 400c may include determining that the second network node is to control its components based on the set of power trace trajectories of the wireless device, as referenced by block 403c. At block 405c, the method 400c includes receiving, by the second network node, from the first network node, current transmission information associated with a transmission, by the first network node on a beam that corresponds to a current location of the wireless device, of a beam reference signal or a wireless device-specific data signal. Additionally, the method 400c may include determining the current transmission information at the current location of the wireless device, as referenced by block 407c.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Solutions for 4G, 5G, and the like that use beamforming arrangements do not have any E2E connection and interaction depending on the power usage (e.g., power mapping, power traces of users), resource data allocation of a mobile device (e.g., UE) location that predicts the energy (or power) usage of a current base station (BS) (to enable turn on/off of beamforming and turn on/off of the segmented DC/DC converter circuits of the radio unit) in use and that also may predict the future base station power consumption. Therefore, current eNBs/gNBs are failing to predict mobile devices' power propagation (e.g., power trace propagation, power trace trajectory, power usage classification) and mobile devices' future routing power demand prediction in relation to E2E power in base station (e.g., radio unit, baseband unit, power unit) for power demand for a cluster of base stations in the RAN network.

Figure 7:
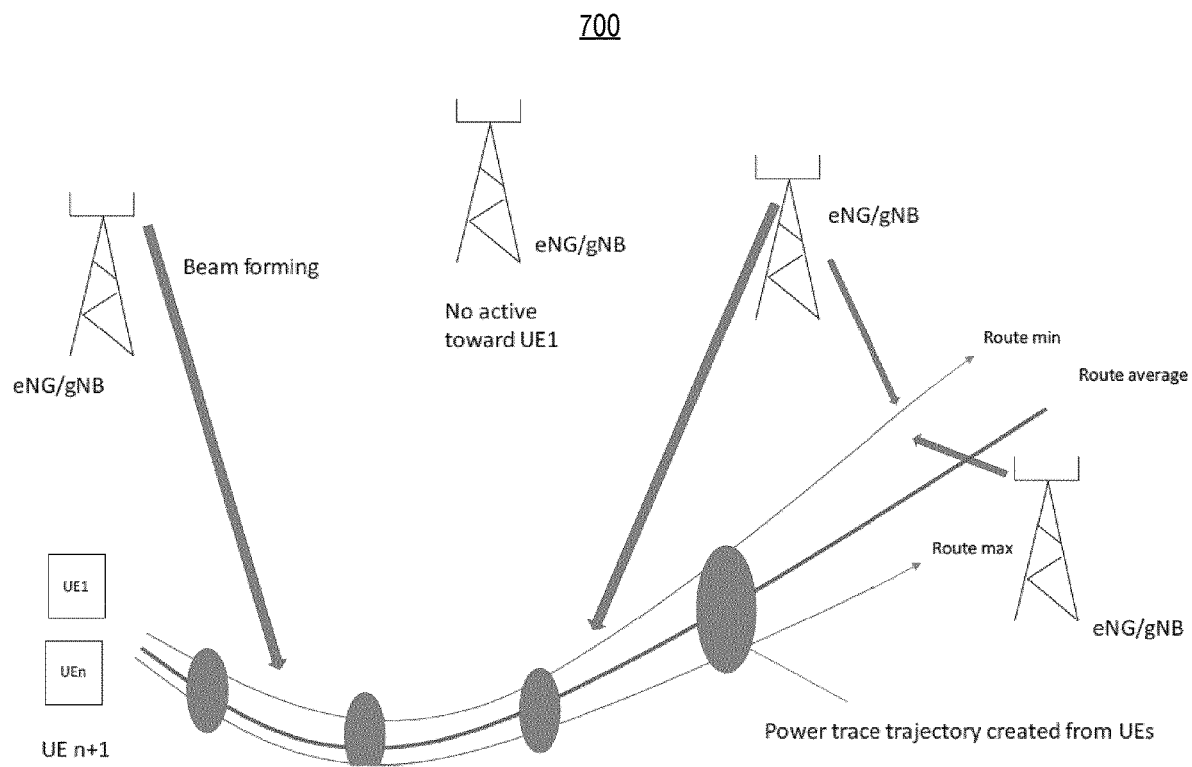
FIG. 7 illustrates a power trace trajectory creation from UEs along the path for different power usage of the beamforming antenna in accordance with various embodiments as described herein.

Currently, no methods propose a future power map trace propagation (e.g., for different UEs, and classifications of UEs) for each base station, that have a direct connection and interaction of the UE routing (with energy usage of a base station or cluster of base station arrangement in the RAN network (e.g., eNB/gNB . . . eNB/gNBn+1), for the UE predicted routes as shown by FIG. 7, in conjunction with its power trace trajectories. Here, we denote gNB as the current served node and gNB+1 as the next served node in the UEs power trace trajectory.

Figure 6:
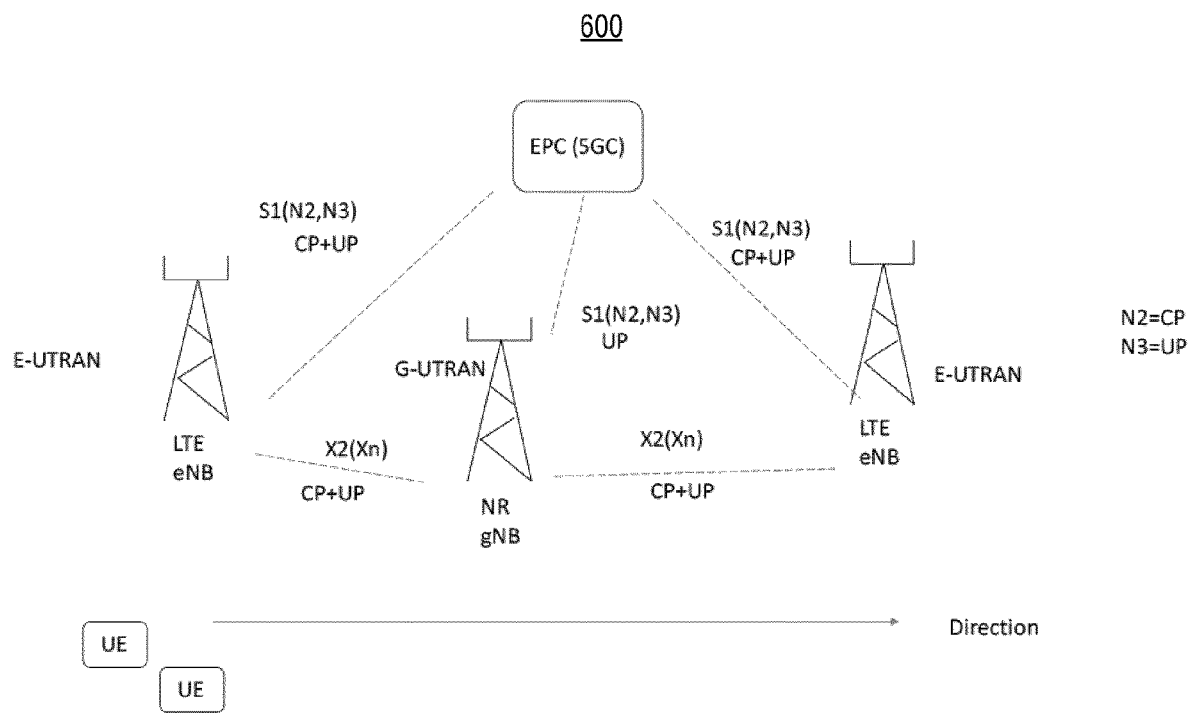
FIG. 6 illustrates a 5G architecture having an eNB and gNB arrangement in accordance with various embodiments as described herein.

In this this disclosure, systems and methods are presented to improve and reduce the total base station (e.g., eNB, gNB) power consumption and for a cluster of neighboring base stations (e.g., $eNB_{n+1}/gNB_{n+1}$ in the RAN network (e.g., EPC/5GC) and implemented efficiently by using a machine learning (ML) arrangement. These systems and methods may calculate and propose future power usage for a cluster of base stations (e.g., $eNB_{n+1}$, $gNB_{n+1}$) as shown by FIG. 6, used by the different mobile devices. UEs enter a cell and the preferred beam (or set of N preferred beams) and power per PRB is determined at a given point in time (e.g., contained in slot information or subframe information). The UE reports the set of N preferred beams using a CSI-RSRP report on measured SSBs or on beamformed CSI reference signals (CSI-RS).

The UE's future routing, beam and power usage based on beamforming, and future time locations subframe or slot information may be computed to generate a beam/power trace trajectory map over time and also a classification that is based on power information (subframe or slot information used to make the classification) and may be made towards a power usage for each served UE, as shown by FIG. 7. A UE classification may be associated with different transmit or receive data rates such as those associated with a voice call, SMS message, MMS message, video streaming, music streaming, or the like, with each of these requiring different power from the network.

In one example, a base station that streams a video of ten minutes length to a UE does not stream all ten minutes of the video at one time. Instead, the base station streams one minute of video at a time (in advance). By recognizing this, a network node may generate a different power pattern using certain beams that may be different than those used for transmissions during a call or for a transmission of SMS data. These power patterns may be placed on a power trace trajectory map in the model to generate a future control mechanism to activate and deactivate beams and components of the base station (e.g., segmented DC/DC converters, system PSU).

Power optimization is based on subframe or slot information where power trace trajectories are generated for each UE, as shown by FIG. 7. Each power trace trajectory represents power needed for each UE at a certain time on its predicted routes such as a predicted minimum route, an average route, and a maximum route. When the model generates the power trace trajectory of each UE, a power optimization is done for the future routes of those UEs having a certain classification to activate or deactivate one or more beams (that enables network power savings) and later on when the next power trace trajectory along the predicted routes is generated, beams may be deactivated in advance, and also segmented radio DC/DC converters and the system PSU on a node level.

Machine learning is used to create a power map, power trace trajectory based on UE classification, and power demand. Further, machine learning is used to propose a new power trace trajectory map (e.g., power usage by the base station). The serving base station (e.g., eNB, gNB) applies the new power trace trajectory map to enable power savings in a next serving node (e.g., $eNB_{n+1}$, $gNB_{n+1}$) by not activating selected beams (e.g., not transmitting the associated beam reference signal), or by not activating a segmented DC/DC converter or system PSU for the serving base station (e.g., eNB, gNB) in advance. All data (e.g., UE classification tagging, power usage (subframe or slot information), resource allocation) is stored in a memory inside an array arrangement for processing (and is later used for historical data calculations) in the machine learning arrangement to create a power trace trajectory map.

Several UEs generate a power pattern/routing, as shown by FIG. 7, and may have several routes for one day or days, that may be computed in the machine learning arrangement to improve the future beamforming signal and power usage in the antenna ports (beams) for a specific UE (or several UEs for a cluster of eNBs/gNBs). Based on different routes of UEs, as shown by FIG. 7, that the UEs have made at different past times, a future prediction behavior is made to obtain the average route vs the average power consumption of several base stations (e2e) eNB/gNB power usage, as shown by FIG. 6, based on the historical data that is stored inside the memory. The data may be stored for minimum, average and maximum power deviation for the UE power trace.

Figure 5:
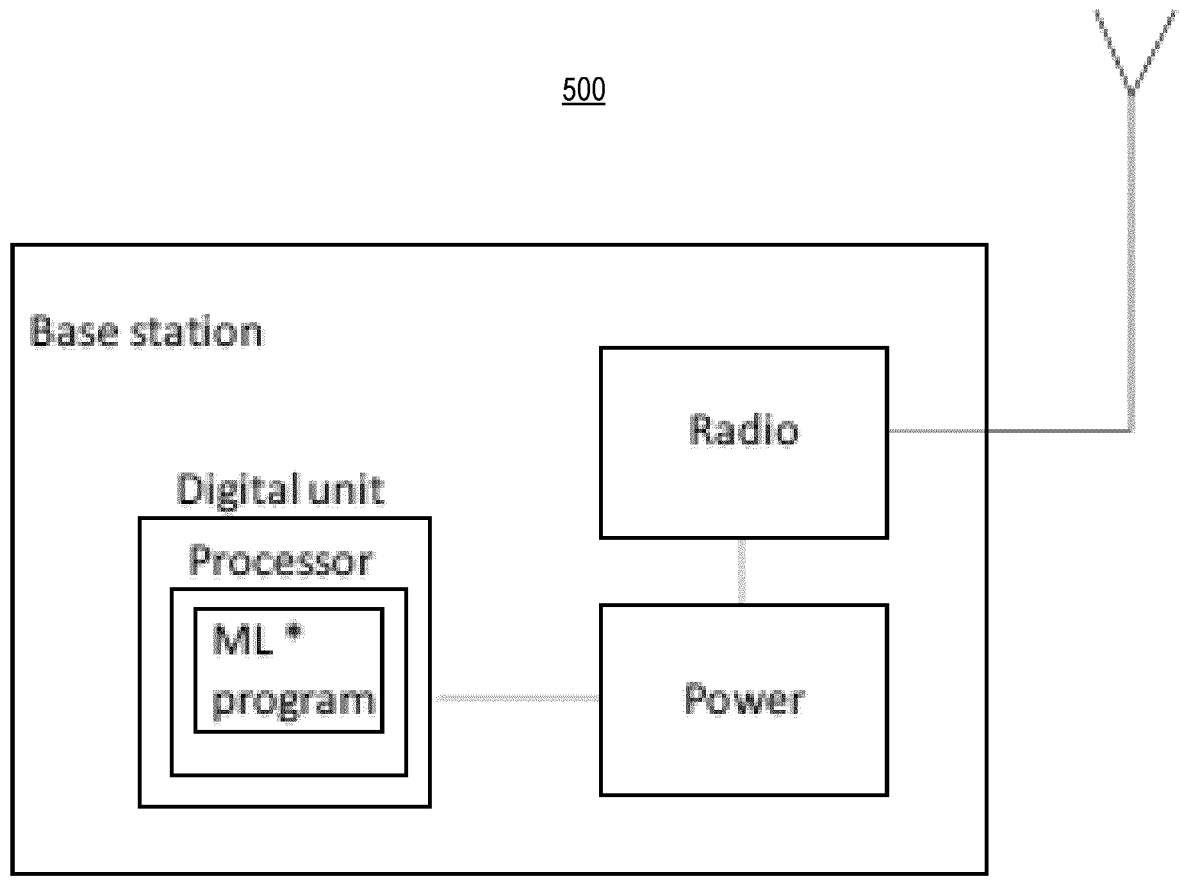
FIG. 5 illustrates another embodiment of a network node in accordance with various aspects as described herein.

Power consumption is calculated (collected from all subframe or slot information via PRB) summarized and specified to be used for processing and future control and power need for an eNB/gNB that is extracted from the routings and are used to control the base station and for future cluster of $eNB_{n+1}/gNB_{n+1}$ along the predicted path to enable energy saving based on controlling the power units inside several eNB/gNB, as shown by FIGS. 6 and 7. Power savings are made and accomplished for the eNB/gNB when the UE enters the eNB/gNB cell areas that are in use. Power trace trajectory map is sent to nearby eNBn+1/gNBn+1 for enable and control of segmented DC/DC converters inside the radio unit and system PSU for the eNBn+1/gNBn+1. Also, power saving may be accomplished to predict and use specific or reduced beamforming antenna port in current base station, as shown by FIG. 5, and neighboring base stations in the RAN network, as shown by FIG. 6.

EPC and 5GC Architecture (as Shown by FIG. 6)

Figure 8:
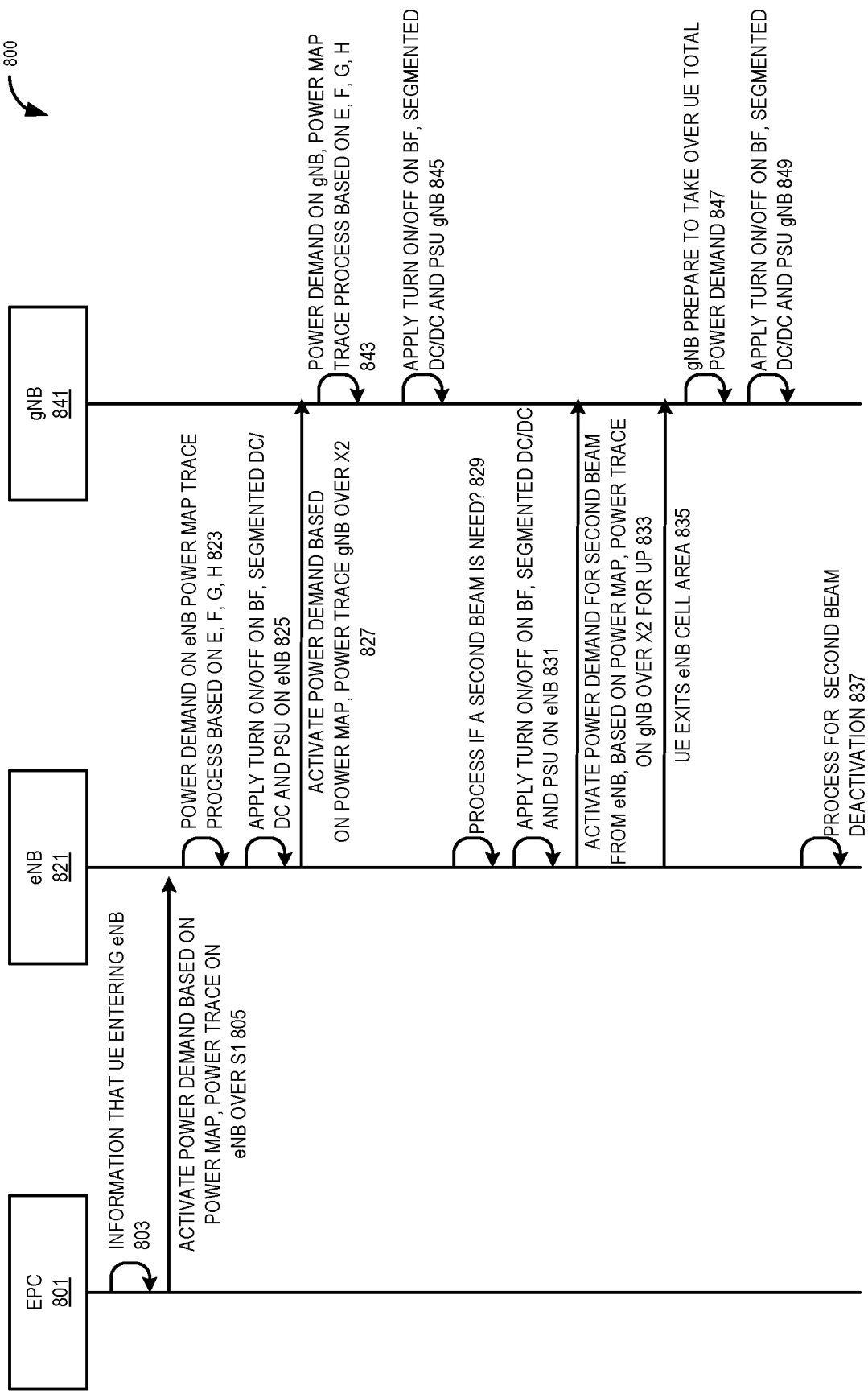
FIG. 8 is a signal flow diagram of one embodiment of a system of controlling a component of a network node based on a power trace trajectory map and a power savings control in accordance with various aspects as described herein.

The 5G architecture is very flexible and scalable. Features and control function may be scalable and moved near the antenna location, hub or near Central office (Access site), depending on use case. Depending on use and deployment, different RAN network possibilities may be adopted (e.g., centralized RAN, distributed RAN, mix or split architecture). The base stations (e.g., LTE eNB, NR gNB) may be deployed in different configurations within the architecture as shown by FIG. 6. The machine learning arrangement in 5G may be applied inside the baseband (BB) unit, as shown by FIG. 5, or moved to the core network (CN) depending on use case and how the network slicing is done. The RAN control arrangement is also proposed, as shown by FIG. 8, and how it is involved when needed to send the power trace trajectory map to and from the nodes, eNBn+1/gNBn+1, of the network.

BF Arrangement and RAN BF Arrangement

This disclosure describes controlling (e.g., enabling/disabling) the beamforming beams (e.g., antenna ports, SSBs, beamformed CSI-RS), the radio segmented DC/DC converters inside the radio unit and the system PSU on power system to enable energy savings in conjunction, from network level to hardware infrastructure, by making a power trace trajectory map of UEs predicted routes, that may be determined from subframe or slot information, for minimum, average and maximum power usage (e.g., by the radio unit).

Inside the subframe or slot information, the power used/demanded is described for each PRB that is then used by the base station to predict and control (e.g., enable/disable):

1) a beamforming beam (e.g., antenna port);
2) a segmented DC/DC converter of the radio unit; or
3) a PSU on a system level of the network node.

A PRB is the smallest element to derive power information (from the time-frequency grid) and used in the machine learning arrangement. Reference signals (e.g., SS, SS/PBCH, SSB such as provided for coverage) that are sent periodically may be sent to UEs, such as from eNB to gNB to UE, as shown by FIG. 6.

While todays NR standard requires that a data package be transmitted from two separate nodes or two different beams used by one node, this requires that the radio hardware and system hardware of a base station (e.g., eNB, gNB) be in an active state, consuming more power. Instead, this disclosure describes using a machine learning arrangement to map power traces in advance, calculating the future power demand of each UE, and determining, based on the data (e.g., subframe and slot information), to send data from one beam of a first serving node (e.g., eNB) and not to send data from a second node (e.g., gNB) (such as by not activating a beam of the second node) to keep the radio segmented DC/DC converter(s) and the system PSU of the second node in an "off" state, where the hardware consumes less power, as described by FIG. 6. Hence, the second node reduces its network transmissions, resulting in energy savings by the second node. This approach or similar approaches may be adopted for data transmissions between eNB and eNB, eNB and gNB, and gNB and gNB.

Machine Learning (ML) and Collection of Data in Array Structure

Figure 9:
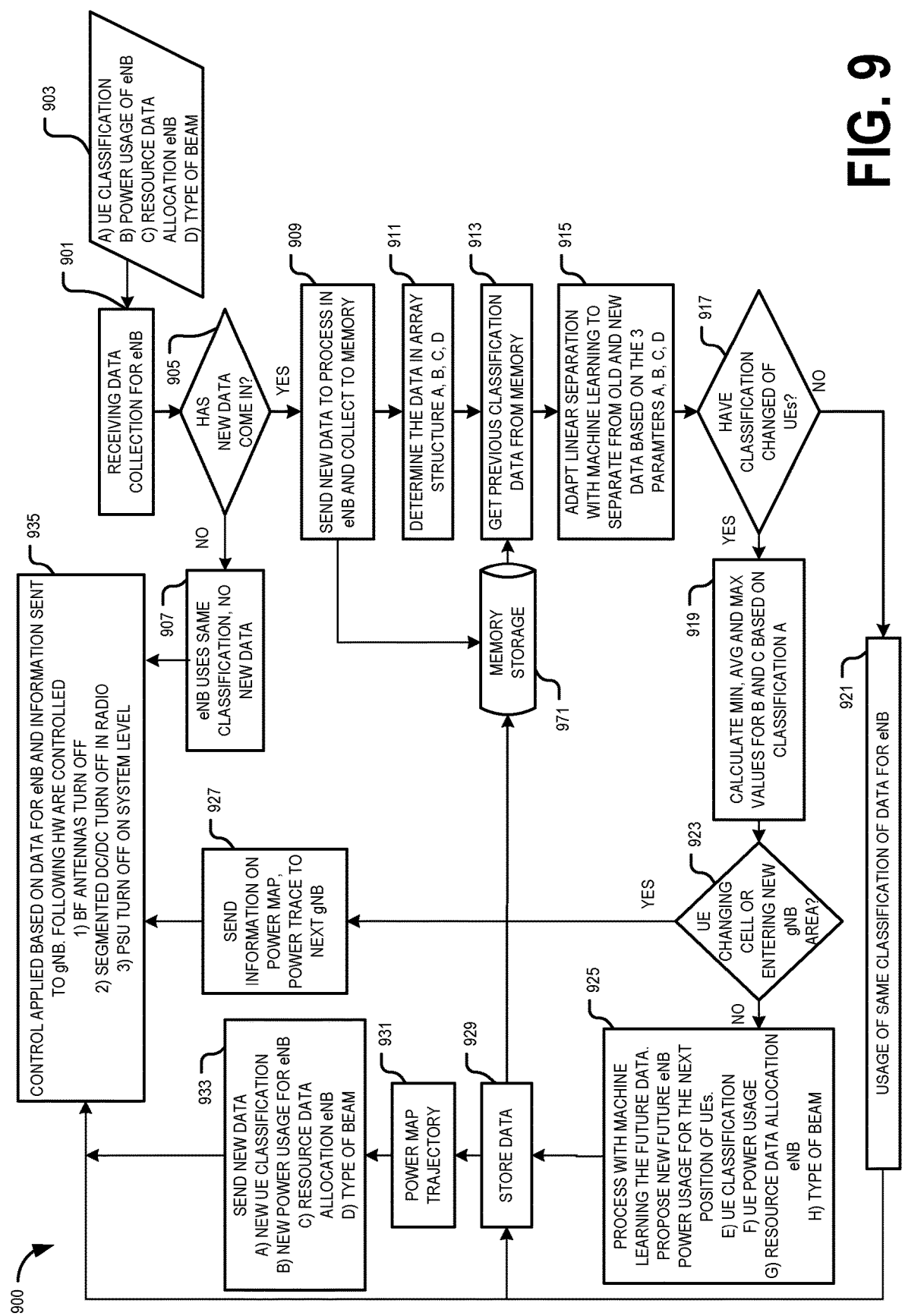
FIG. 9 illustrates a machine learning arrangement for energy savings control of eNB, gNB, or cluster of base stations in an evolved packet core (EPC) in accordance with various embodiments as described herein.

A method is described that first collects data for a critical parameter of the eNB/gNB that is needed for calculations, and this data is stored in array format and processed with a linear separation algorithm to determine linearly separated values, as shown by FIG. 9. Other machine learning arrangements may be applied as time series analysis (e.g., long short-term memory (LSTM)). LSTM may also result in faster processing. To reduce processing complexity or memory storage requirements, all values may not be stored in memory or processed.

The machine learning arrangement calculates the data for different UE classifications, power usage from eNB/gNB, and usage of resource allocation (e.g., subframe or slot information) from eNB/gNB. The machine learning arrangement then determines a new future power trace trajectory map of power usage based on different UE classifications and sends it to neighboring base stations (e.g., eNBn+1/gNBn+1) to be used to control beamformed beams (e.g., antenna ports), radio hardware segmented DC/DC converters, and system PSU to specific or neighboring base stations (e.g., eNBn+1/gNBn+1) such as the next serving nodes in the network (e.g., RAN). This method enables power savings from reduced network transmissions and dynamically disabled components of the base station hardware infrastructure.

All data that is measured is stored in an array structure for easy determination and easier use in the machine learning arrangement for linear determination or LSTM. The following parameters (A, B, and C) are collected from the eNB/gNB for UEs and classification:

A) UE classification (mobile device classification);
B) eNB/gNB power usage for UE classification (e.g., base station power usage of UE in the cells such as minimum, average and maximum values);
C) resource data allocation eNB/gNB (e.g., BS amount data that is used for one UE, and antennas).

This data is stored in an array structure for the different parameters with their respective values (e.g., data1 to data4) such as:

$$\begin{pmatrix} A(n) \\ B(n) \\ C(n) \end{pmatrix} = \begin{pmatrix} data1 \\ data1 \\ data1 \end{pmatrix}.$$

One array is created for mobile device (e.g., UEs) classification. The array is determined by the following parameters A, B, C (from n=1 to x, n represent data (values) collection of different UE's classification, power usage sent from eNB/gNB, and resource data allocation from base station based on subframe or slot information.

The data value collection is structured for machine learning in array format. The first measured values are represented by a first array with the values indicated by X1, Y1 and Z1.

A second array of the measured values are built and indicated by X2, Y2 and Z3.

When new values are built, they are indicated by X3, Y3, Z3, W3. This pattern continues with $X_n$, $Y_n$ and $Z_n$ for different measured location points of the UE: n=1, 2, 3, 4, 5 . . . , x. For instance, an array is represented by:

$$\begin{pmatrix} A(n) \\ B(n) \\ C(n) \end{pmatrix} = \begin{pmatrix} data1 \\ data1 \\ data1 \end{pmatrix}$$

N=0 . . . x=new value of A, B and C.

Further, a first array is represented by:

$$\begin{pmatrix} A(1) \\ B(1) \\ C(1) \end{pmatrix} = \begin{pmatrix} X1 \\ Y1 \\ Z1 \end{pmatrix},$$

with N=1 being the first value of data A, B and C.

By adding a new value to the first array, the first array is now represented by:

$$\begin{pmatrix} A(2) \\ B(2) \\ C(2) \end{pmatrix} = \begin{pmatrix} X1 & X2 \\ Y1 & Y2 \\ Z1 & Z2 \end{pmatrix},$$

with N=2 being the second value of data A, B and C.

This progression continues with the data collection to obtain the best possible historical data n=1 . . . x.

UE Classification and Connection to Power Map, Power Traces (See FIG. 7)

Each UE is visible on the network, when it enters the eNB/gNB coverage range. To determine power savings of a 5G base station (e.g., eNB/gNB), the power usage is determined versus the power trace trajectory map and UE classification. Data needs to be collected regarding power usage from base station and resource allocation in the base station. For example, as shown by FIG. 7, when a UE moves into the eNB/gNB cell areas, the eNB/gNB register the UEs activity (that probably follows a route under one way), the machine learning arrangement makes a classification of the UEs, registers the power usage on the eNB/gNB and resource allocation used of the UEs activity.

For UEs that pass in the eNB/gNB cells area, the eNB/gNB registers their UE classifications, power usage and resource allocation for each moment (e.g., second, minute, hour, or portion thereof) of a day. The eNB/gNB creates a power trace trajectory map, power route for the days and user classifications and routes. Every day, parameter values are stored in the array that represents parameters A, B and C to update the machine learning algorithm and to be used for future control of eNBn+1/gNBn+1. Other data may also be sent such as the type of beam used (connected) for power, beam time used, dedicated to the UE classification, segmented DC/DC converter used or/not used, system PSU activation or deactivation, and the amplitude/phase shifts (denoted as the antenna weights and the collection of the antenna weights for each of the antennas) that is represented as a precoding vector (indirect the vector have information also about the UE location).

In FIGS. 6-7, different routes by UEs may be seen from the eNB/gNB and after that the UE classification has been done and enough data is collected (multiple routes are used in machine learning arrangement) to build the array, the machine learning arrangement may apply machine learning of the specified UE classification, and the machine learning arrangement may propose to activate or deactivate in real time eNB to make power savings in conjunction, by selectively controlling the following elements to first, control the radio antenna elements to "turn off"; second, turn off the segmented DC/DC converters inside radio units, and third, turn off PSU on system level for the eNB.

When machine learning arrangement has predicted the classification of the UEs classification power map, power traces may be sent to neighboring eNBn+1/gNBn+1, in the RAN network to enable power savings there as well. The information to the nearby eNB/gNB is sent from the eNB to nearby eNB/gNB, so the eNB/gNB may in advance control (activate or deactivate) to first, control the radio antenna elements to "turn off"; second, turn off the segmented DC/DC converters inside radio units; and third, turn off PSU on system level for the eNB/gNB.

By sending classification and power trace information to neighboring second eNB/gNB, the second eNB/gNB may be activated when needed to allow the second eNB/gNB to save energy in idle mode. The power savings control may be performed for beam deactivation, segmented DC/DC converter deactivation, system PSU deactivation, and the like.

In this machine learning arrangement, the need to activate/deactivate future beams is determined based on previous data information in the training model, UE classification and power routing paths, which results in determining which beams to use in the future and which beams to activate/deactivate to enable power savings in the node. Of course, control signals must be periodically sent.

UEs are classified based on how much power is used or needed (or beam power need subframe or slot information from the beam towards the UE) by determining the minimum, average and maximum values along the UE routes, as described by FIG. 7.

ML for Neighboring eNBn+1/gNBn+1 and RAN Network FIG. 4

The power trace trajectory map for an evolved packet core (EPC), eNB and gNB is used and sent to neighboring base station, $eNB_{n+1}/gNB_{n+1}$, to in advance activate or deactivate radio hardware based on the location of UEs and power trace trajectory map. The machine learning arrangement may be executed and moved to different locations depending on use case and also the RAN architecture (e.g., distributed RAN, virtualized RAN, split architecture, or the like) in the network, and may be executed in containers or a virtual machine (VM).

The power consumption in the radio and antenna elements (port) is well known and it is based on the subframe or slot information that enables us, to basically know in every step, what power consumption is needed for every position on the route of the UE by sending the power trace trajectory map to nearby nodes in advance. By knowing the power consumption of the classification of the UEs (UE power route inside the eNB/gNB cells) in the past, the power consumption in the future may be specified for the eNBn+1/gNBn+1, if the power information is collected and processed based on UE location.

To avoid misleading data based on different routes of the UEs, the machine learning arrangement extracts the minimum, average and maximum power consumption of all UEs and classifications and the corresponding eNB/gNB controls its internal components (e.g., enables or disables power units) to obtain power savings based on UEs demand or classification.

The machine learning arrangement may extract power savings for a cluster of $eNB_{n+1}/gNB_{n+1}$, as described by FIGS. 6 and 7, based on the UE routes, using the same method. By doing so, energy savings are achieved for a cluster of base stations, by calculating the power consumption of a specific UE or several UEs in advance based on their routes. This information may be used as input to select right beamforming arrangements and base station energy saving functions.

The machine learning arrangement, as shown by FIG. 9, processes and extracts the future data needed for the UE based on classification, power usage and resource allocation, allowing for the eNB/gNB to activate radio and power usage that is needed for future beamforming. A power trace trajectory map is also determined for a cluster of future base stations, $eNB_{n+1}/gNB_{n+1}$, as described by FIG. 8.

In another embodiment, other data (except as UE classification, power usage subframe or slot information) that may be sent and used in the model include: type of beam used (connected) for power, beam time used, dedicated to the classification, segmented DC/DC used or not used, and system PSU activation or deactivation. Further, via the beam management, the base station may extract and send the amplitude/phase shifts (denoted as the antenna weights and the collection of the antenna weights for each of the antennas) that is a precoding vector (the precoding vector may also implicitly indicate the location of the UE).

The prediction of future values is determined for the following parameters: UE classification, power usage from eNB/gNB, resource data allocation eNB/gNB, and type of beam. Other parameters may include the beam used (connected) for power, beam time used, dedicated to the classicization, segmented DC/DC used or/not, and system PSU activation or not. Further, via beam management, the base station may extract and send the amplitude/phase shifts (denoted as the antenna weights and the collection of the antenna weights for each of the antennas) that is a precoding vector (indirect the vector have information also about the UE location).

FIG. 8 is a signal flow diagram of one embodiment of a system 800 of controlling a component of a network node 821, 841 based on a power trace trajectory map and power savings control in accordance with various aspects as described herein. In FIG. 8, the system 800 includes an EPC 801, an eNB 821, and a gNB 841. The EPC 801 obtains information that a UE is entering a cell of the eNB 821, as represented by reference 803. Further, the EPC 801 sends, to the eNB 821 over an S1 interface, an indication that the eNB 821 activate power demand based on a power map and a power trace, as represented by reference 805. The eNB 821 receives this indication and in response, activates the power demand on the eNB 821, resulting in executing the power map trace process based on the parameters E, F, G and H, as represented by reference 823. Further, the eNB 821 controls one or more components of the eNB 821 based on the power map trace process, as represented by reference 825. In addition, the eNB 821 determines to activate power demand for the gNB 841 based on the power map and the power trace. In response, the eNB 821 sends, to the gNB over an X2 interface, an indication to activate power demand for the gNB based on the power map and the power trace, as represented by reference 827.

In FIG. 8, the gNB 841 receives this indication and in response, the gNB 841 activates the power demand on the gNB 841, resulting in executing the power map trace process based on the parameters E, F, G and H, as represented by reference 843. Further, the gNB 841 controls one or more components of the gNB 841 based on the power map trace process, as represented by reference 845. In addition, the eNB 821 determines that a second beam such as required for a handover or a soft handoff is needed based on the power map trace process, as represented by reference 829. Meanwhile, the eNB 821 continues to control one or more components of the eNB 821 based on the power map trace process, as represented by reference 831. In response to determining that the second beam is needed, the eNB 821 sends, to the gNB 841 over the X2 interface, an indication to activate a power demand for the UE by the gNB 841 based on the power map and the power trace, as represented by reference 833. The gNB 841 receives the indication and in response, the gNB 841 prepares to take over the power demand of the UE, as represented by reference 847. Further, the gNB 841 continues to control its one or more components based on the power map trace process, as represented by reference 845. Contemporaneously, the eNB 821 deactivates its power map trace process for that UE, as represented by reference 837.

FIG. 9 illustrates one embodiment of a method 900 for energy savings control of eNB, gNB or a cluster of base stations in EPC, in accordance with various embodiments as described herein. This model is an online model (data processed when it comes in) and this is due to that there is daily/hourly radio data traffic variation within a day and in different times of the day. The online learning enables fast power savings by controlling the beams in the network, and the segmented radio DC/DC converters and system PSU on the node level. The data at a given stage and conditions will affect the power saving in the network and at the node level. To reduce complexity, the model only stores in memory values vs. UE classification for minimum, average and maximum routes, as described by FIG. 7. The model changes in time (only minimum, average and maximum routes are changed) that follow daily data traffic variation and may be set to get hourly input based on traffic (may be a changeable or adaptable capability such as a batch determination of data may be performed periodically such as every hour or day). By doing so, only data values for minimum, average and maximum routes that have significant impact (e.g., impact on minimum, average and maximum routes) are stored and changes only if new values are generated depending on the previous values of the minimum, average and maximum routes if changed. Other data that has no impact on the minimum, average and maximum routes and are in-between (min, average, max) are not stored (within that hour) but data may need to be stored for each hour such a 24-hour day cycle of power data. This 24-hour data may be stored and may be sent periodically such as hourly to neighboring sites or to the RAN to enable power saving for those neighboring sites.

In FIG. 9, the method 900 may start, for instance, at block 901 where it may include receiving a data collection from an eNB. The collected data, as described by block 903, may include the following parameters: A) UE classification, B) power usage of eNB, C) resource data allocation eNB, and D) type of beam. At block 905, the method 900 may include determining whether new data has been received. If no new data has been received, then the method 900 may include using the same UE classification, as represented by block 907. However, if new data has been received, then the method 900 may include sending the new data to process in the eNB and adding the new data to the collected data stored in memory 971, as represented by block 909. At block 911, the method 900 may include determining the data in an array structure having the parameters A, B, C and D. At block 913, the method 900 may include obtaining previous classification data from the memory 971. At block 915, the method 900 may include adapting linear separation via a machine learning arrangement to separate old and new data based on three of the parameters A, B, C and D. At block 917, the method 900 may include determining whether the classification changed of the UEs. If the classification has changed, then method 900 may include determining minimum, average and maximum values of the parameters B and C based on the UE classification parameter A, as represented by block 919. However, if the UE classification has not changed, then the method 900 may include using the same UE classification of data for the eNB, as represented by block 921.

In FIG. 9, the method 900 may include determining whether the UE is changing cells or entering a new base station (e.g., eNB, gNB) area, as represented by block 923. If the UE is not changing cells and not entering a new base station area, then the method 900 may include processing via another machine learning arrangement the future data represented by parameters E, F, G, and H, resulting in proposed new future eNB power usage for the next position of the UEs, as represented by block 925. These parameters are described as follows: E) UE classification, F) UE power usage, G) resource data allocation (such as on a time/frequency grid) of the eNB, and H) type of beam. These parameters E, F, G, and H are then stored in the memory 972 with the collected data, as represented by block 929. However, if the UE has changed cells or entered a new base station area, then the method 900 may include sending information on the power map and the power trace to the next base station (e.g., gNB), as represented by block 927. At block 931, the method 900 may include determining a power trace trajectory map for the UE based on the updated collected data stored in the memory 971. At block 933, the method 900 may include sending the new data represented by parameters A, B, C, and D. These parameters are described as follows: A) new UE classification, B) new power usage of eNB, C) new resource data allocation of eNB, and D) type of beam. At block 933, the method 900 may include controlling one or more components of the eNB based on data for the eNB and information sent to the gNB. The following components may be controlled: beamforming antennas may be turned on or off, segmented DC/DC converters may be turned on or off in the radio, and/or a PSU may be turned on or off at the system level of the eNB.

Abbreviations

| Abbreviation | Explanation |
| --- | --- |
| BB | Base Band |
| BF | Beam Forming |
| BS | Base station |
| BRS | Beam Reference Signal |
| CN | Core Network |
| CP | Control plane |
| cRAN | Centralized RAN |
| CSI | Channel State Information |
| CSI-RS | Channel State Information-Reference Signals |
| CSI-RSRP | Channel State Information Reference Signal Received Power |
| DC/DC | DC to DC converter |
| DCI | Downlink Control Information |
| dRAN | Distributed RAN |
| eNB | LTE node |
| eNBn + 1/ gNBn + 1 | Future or next nearby eNB respective next nearby gNB |
| e2e | End 2 End |
| EPC | Evolve Package core |
| E-UTRAN | Evolved Terrestrial Radio Access Network |
| GHz | Giga Hz |
| gNB | gNode B (supporting NR and connectivity to NGC) |
| Hz | Hertz |
| IoT | Internet of Things |
| LSTM | Long short-term memory |
| LTE | Long Term Evolution |
| MAC | Medium Access Control |

-continued

| Abbreviation | Explanation |
| --- | --- |
| MAC CE | MAC Control Element |
| ML | Machine Learning |
| mmW | Millimeter Wave |
| n + 1 | Next coming index (next coming node) |
| NR | New Radio |
| OFDM | Orthogonal Frequency Division Multiplexing |
| PBCH | Physical Broadcast Channel |
| PDCCH | Physical Downlink Control Channel |
| PS | Power System |
| PSU | Power Supply Unit |
| PRB | Physical Resource Block |
| RAN | Radio Access Network |
| RBS | Radio Base Station |
| RS | Reference Signal |
| RSRP | Reference Signal Received Power |
| SF-info | Sub Frame information for LTE, eNB |
| Slot-info | Slot info for NR, gNB |
| SRS | Sounding Reference Signal |
| SS | Synchronization Signals |
| SS/PBCH | Synchronization Signals/Physical Broadcast Channel |
| SSB | Synchronizing Signal Block |
| TDM | Time Domain Multiplexing |
| TRP | Transceiver Receiver Point |
| TTI | Transmission Time Interval |
| TX | Transmitter |
| RX | Receiver |
| VM | Virtual Machine |
| UE | Unit Equipment (mobile device) |
| UP | User plane |
| QoS | Quality of Service |
| 3GPP | Third Generation Partnership Project |
| 5GC | 5G Core Network |

The various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method performed by a network node in a communications system, comprising:
    obtaining a current location of one or more wireless devices that is determined from measurements reported by each wireless device of at least one of a set of beam reference signals transmitted by the network node or measurements performed by the network node of a signal transmitted by the one or more wireless devices on a beam that is spatially related to a beam associated with the corresponding beam reference signal received by that wireless device, with each beam reference signal being transmitted on a different beam and in a different beam direction by the network node; and
    controlling one or more components of the network node that enables or disables a transmission on one or more beams of at least one beam reference signal or adjusts a transmission power of a transmission on the one or more beams of at least one beam reference signal or wireless device-specific data signal, based on a set of power trace trajectories of each wireless device, with each power trace trajectory representing an estimated power required by the network node for transmissions on a beam of a beam reference signal or a wireless device-specific data signal to a corresponding wireless device or to a wireless device having a same classification as the corresponding wireless device, at a certain time along predicted routes of that wireless device starting from the current location of that wireless device.

2. A network node in a communications system, the network node comprising a processing circuitry and a memory storing program code that, when executed by the processing circuitry, causes the network node to:
    obtain a current location of one or more wireless devices that is determined from measurements reported by each wireless device of at least one of a set of beam reference signals transmitted by the network node or measurements performed by the network node of a signal transmitted by the one or more wireless devices on a beam that is spatially related to a beam associated with the corresponding beam reference signal received by that wireless device, with each beam reference signal being transmitted on a different beam and in a different beam direction by the network node; and
    control one or more components of the network node that enables or disables a transmission on one or more beams of at least one beam reference signal or adjusts a transmission power of a transmission on the one or more beams of at least one beam reference signal or wireless device-specific data signal, based on a set of power trace trajectories of each wireless device, with each power trace trajectory representing an estimated power required by the network node for transmissions on a beam of a beam reference signal or a wireless device-specific data signal to a wireless device at a certain time along predicted routes of that wireless device starting from the current location of that wireless device.

3. The network node of claim 2, further caused to:
    obtain collected data that represents a transmission information associated with previous transmissions on the one or more beams of a beam reference signal or a wireless device-specific data signal by the network node to other wireless devices along the predicted routes of each wireless device; and
    determine the set of power trace trajectories of each wireless device based on the collected data and the set of projected routes of that wireless device.

4. The network node of claim 3, wherein when obtaining the collected data, the network node is further caused to:
    obtain current transmission information associated with a transmission, by the network node on a beam that corresponds to the current location of that wireless device, of a beam reference signal or a wireless device-specific data signal; and
    process, by a first machine learning arrangement that is trained with the collected data so that the set of power trace trajectories of each wireless device are predicted, the current transmission information to update the collected data.

5. The network node of claim 4, wherein when obtaining the current transmission information, the network node is further caused to:
    receive, from another network node associated with that wireless device, the current transmission information.

6. The network node of claim 5, wherein when obtaining the collected data, the network node is further caused to:
    adapt, by a second machine learning algorithm, a linear separation of the current transmission information from the collected data that is associated with the current location of that wireless device.

7. The network node of claim 4, wherein the current transmission information includes:

a power usage of the network node for transmissions on the one or more beams of a beam reference signal or a wireless device-specific data signal to that wireless device at the current location or along the predicted routes of that wireless device;

a resource allocation of the network node for transmissions on the one or more beams of a beam reference signal or a wireless device-specific data signal to that wireless device at the current location or along the predicted routes of that wireless device;

a classification of that wireless device at the current location or along the predicted routes of that wireless device, wherein each classification is associated with a different transmit or receive data rate; or a type of beam transmitted between the network node and that wireless device at the current location or along the predicted routes of that wireless device.

8. The network node of claim 7, further caused to:
obtain the predicted routes of each wireless device based on the current location of that wireless device, wherein, when obtaining the predicted routes, the network node is further caused to:
determine the predicted routes of at least one of the one or more wireless devices based on the current location of that wireless device,
wherein each wireless device is associated with the network node or another network node that is communicatively coupled to the network node.

9. The network node of claim 8, wherein when obtaining the predicted routes, the network node is further caused to:
receive, from another network node, the predicted routes of at least one of the one or more wireless devices.

10. The network node of claim 2, wherein when controlling the one or more components, the network node is further caused to selectively control two or more components of the network node based on the set of power trace trajectories of each wireless device, wherein when selectively controlling, the network node is further caused to:
control a first component of a radio unit of the network node to disable a transmission of at least one beam reference signal or wireless device-specific data signal by a beamforming antenna element prior to controlling a third component to disable power to the radio unit.

11. The network node of claim 2, wherein the one or more components of the network node include:
a first component of a radio unit of the network node that is operable to enable or disable a transmission of at least one beam reference signal or wireless device-specific data signal by a beamforming antenna element;
a second component of the radio unit that is operable to adjust a transmission power of a transmission of at least one beam reference signal or wireless device-specific data signal; or
a third component that is operable to enable or disable power to the radio unit.

12. The network node of claim 2, wherein when controlling, the network node is further caused to:
control the one or more components to enable or disable the transmission of the at least one beam reference signal responsive to determining that the at least one beam reference signal is directed towards or away from the predicted routes of the one or more wireless devices.

13. The network node of claim 2, wherein the predicted routes represent at least one of a minimum route, a maximum route, and a route between the minimum and maximum routes for that wireless device.

14. The network node of claim 2, wherein said controlling is also based on a classification of each wireless device, wherein said controlling provides for the network node consuming less power than that required to always transmit the set of beam reference signals by the network node at a non-adjusted transmission power.

15. The network node of claim 2, wherein each classification is associated with a different transmit or receive data transfer rate.

16. The network node of claim 2, further caused to:
send, by the network node, to a second network node that is associated with at least one of the one or more wireless devices, an indication that the second network node is to control one or more components of the second network node based on a set of power trace trajectories of that wireless device.

17. The network node of claim 16, wherein said sending is responsive to determining that that wireless device is in a region that represents an intersection between a cell of the network node and a cell of the second network node.

18. The network node of claim 2, further caused to:
send, by the network node, to a second network node that is associated with at least one of the one or more wireless devices, current transmission information associated with a transmission by the network node on the one or more beams to that wireless device at the current location of that wireless device.

19. The network node of claim 2, further caused to:
receive, by the network node, from a second network node that is associated with at least one of the one or more wireless devices, an indication that the network node is to control one or more components of the network node based on the set of power trace trajectories of that wireless devices.

20. The network node of claim 2, wherein each power trace trajectory includes one or more of the following:
a power usage of the network node for transmissions on the one or more beams of a beam reference signal or a wireless device-specific data signal to a wireless device at a certain location or along a certain route of that wireless device;
a resource allocation of the network node for transmissions on the one or more beams of a beam reference signal or a wireless device-specific data signal to a wireless device at the certain location or along the certain route of that wireless device;
a classification of a wireless device at the certain location or along the certain route of that wireless device, wherein each classification is associated with a different transmit or receive data rate; or
a type of beam transmitted between the network node and a wireless device at the certain location or along the certain route of that wireless device,
wherein each power trace trajectory includes information that represents amplitude and phase shifts associated with one or more antennas.

\* \* \* \* \*